US012806788B2

(12) United States Patent
Dellon

(10) Patent No.: US 12,806,788 B2
(45) Date of Patent: Nov. 24, 2026

(54) SYSTEMS AND METHODS FOR ROBOTIC MANIPULATION USING EXTENDED REALITY

(71) Applicant: Boston Dynamics, Inc., Waltham, MA (US)

(72) Inventor: Brian Todd Dellon, West Roxbury, MA (US)

(73) Assignee: Boston Dynamics, Inc., Waltham, MA (US)

( * ) Notice: Subject to any disclaimer, the term of this patent is extended or adjusted under 35 U.S.C. 154(b) by 223 days.

(21) Appl. No.: 17/693,019

(22) Filed: Mar. 11, 2022

(65) Prior Publication Data

US 2023/0286161 A1 Sep. 14, 2023

(51) Int. Cl.
*B25J 9/16* (2006.01)

(52) U.S. Cl.
CPC ........... *B25J 9/1697* (2013.01); *B25J 9/1612* (2013.01); *B25J 9/162* (2013.01); *B25J 9/1633* (2013.01); *B25J 9/1653* (2013.01); *B25J 9/1664* (2013.01); *B25J 9/1689* (2013.01)

(58) Field of Classification Search
CPC ........ B25J 9/1697; B25J 9/1612; B25J 9/162; B25J 9/1633; B25J 9/1653; B25J 9/1664; B25J 9/1689; B25J 13/02; B25J 15/08; B25J 19/023; G06F 3/011; G06F 3/0346; G05B 2219/32014; G05B 2219/39451; G05B 2219/40298; B62D 57/032
See application file for complete search history.

(56) References Cited

U.S. PATENT DOCUMENTS

| | | | |
|---|---|---|---|
| 6,088,628 A | 7/2000 | Watanabe et al. |
| 7,714,895 B2 | 5/2010 | Pretlove et al. |
| 8,073,564 B2 | 12/2011 | Bruemmer et al. |
| 9,052,710 B1 | 6/2015 | Farwell |

(Continued)

FOREIGN PATENT DOCUMENTS

| | | |
|---|---|---|
| CN | 107265355 | 10/2017 |
| CN | 107515606 | 12/2017 |

(Continued)

OTHER PUBLICATIONS

Uzunovic et al., "Novel Algorithm for Position/Force Control of Multi-DOF Robotic Systems", 2020 IEEE 16 International Workshop on Advanced Motion Control (AMC), Sep. 14, 2020, pp. 273-278.

(Continued)

*Primary Examiner* — Sihar A Karwan
(74) *Attorney, Agent, or Firm* — Knobbe, Martens, Olson & Bear, LLP

(57) ABSTRACT

A method of controlling a robot includes: receiving, by a computing device, from one or more sensors, sensor data reflecting an environment of the robot, the one or more sensors configured to have a field of view that spans at least 150 degrees with respect to a ground plane of the robot; providing, by the computing device, video output to an extended reality (XR) display usable by an operator of the robot, the video output reflecting the environment of the robot; receiving, by the computing device, movement information reflecting movement by the operator of the robot; and controlling, by the computing device, the robot to move based on the movement information.

33 Claims, 21 Drawing Sheets

(56) References Cited

U.S. PATENT DOCUMENTS

| | | | |
|---|---|---|---|
| 9,205,887 B2 | 12/2015 | Darish | |
| 9,283,674 B2 | 3/2016 | Hoffman et al. | |
| 9,352,470 B1 | 5/2016 | da Silva et al. | |
| 9,364,951 B1 | 6/2016 | De Sapio et al. | |
| 9,440,353 B1 * | 9/2016 | da Silva | B25J 9/1633 |
| 9,514,542 B2 | 12/2016 | Matsumoto et al. | |
| 9,536,322 B1 | 1/2017 | Smith et al. | |
| 9,687,983 B1 | 6/2017 | Prats | |
| 9,902,069 B2 | 2/2018 | Farlow et al. | |
| 9,987,744 B2 | 6/2018 | Prats | |
| 10,086,517 B2 | 10/2018 | Touma et al. | |
| 10,166,676 B1 | 1/2019 | Hudson et al. | |
| 10,402,503 B2 | 9/2019 | Shapiro et al. | |
| 10,442,025 B2 | 10/2019 | Jones et al. | |
| 10,603,794 B2 | 3/2020 | Buibas et al. | |
| 10,816,994 B2 | 10/2020 | Tian et al. | |
| 11,232,635 B2 | 1/2022 | Brodsky et al. | |
| 11,340,620 B2 | 5/2022 | Seifert et al. | |
| 12,325,131 B2 | 6/2025 | Aghasadeghi et al. | |
| 12,521,875 B2 | 1/2026 | Barry et al. | |
| 2001/0037163 A1 | 11/2001 | Allard | |
| 2003/0216834 A1 | 11/2003 | Allard | |
| 2005/0104548 A1 | 5/2005 | Takenaka et al. | |
| 2009/0105880 A1 | 4/2009 | Okazaki | |
| 2010/0228397 A1 | 9/2010 | Weber | |
| 2011/0010009 A1 | 1/2011 | Saito | |
| 2011/0202068 A1 | 8/2011 | Diolaiti et al. | |
| 2012/0072023 A1 | 3/2012 | Ota et al. | |
| 2012/0166165 A1 | 6/2012 | Nogami et al. | |
| 2013/0054029 A1 | 2/2013 | Huang et al. | |
| 2013/0325181 A1 | 12/2013 | Moore | |
| 2013/0346348 A1 | 12/2013 | Buehler et al. | |
| 2014/0222206 A1 * | 8/2014 | Mead | B25J 9/1697<br>700/259 |
| 2015/0190925 A1 | 7/2015 | Hoffman et al. | |
| 2015/0273689 A1 | 10/2015 | Ouchi | |
| 2015/0321351 A1 | 11/2015 | Kapoor et al. | |
| 2016/0132623 A1 | 5/2016 | Takeda | |
| 2016/0234436 A1 | 8/2016 | Yu et al. | |
| 2016/0260261 A1 | 9/2016 | Hsu | |
| 2017/0203446 A1 | 7/2017 | Dooley et al. | |
| 2017/0217021 A1 | 8/2017 | Hoffman et al. | |
| 2017/0259433 A1 | 9/2017 | Takeuchi et al. | |
| 2017/0275026 A1 | 9/2017 | Szarski et al. | |
| 2017/0326728 A1 | 11/2017 | Prats | |
| 2018/0043543 A1 | 2/2018 | Buibas et al. | |
| 2018/0181274 A1 | 6/2018 | Jung et al. | |
| 2018/0250822 A1 | 9/2018 | Shimodaira et al. | |
| 2018/0281179 A1 | 10/2018 | Michalakis | |
| 2018/0297204 A1 | 10/2018 | Krasny et al. | |
| 2018/0348764 A1 | 12/2018 | Zhang et al. | |
| 2019/0026958 A1 | 1/2019 | Gausebeck et al. | |
| 2019/0143517 A1 | 5/2019 | Yang et al. | |
| 2020/0001457 A1 | 1/2020 | Limone et al. | |
| 2020/0019237 A1 | 1/2020 | Jackson | |
| 2020/0039082 A1 | 2/2020 | Kapoor et al. | |
| 2020/0094405 A1 | 3/2020 | Davidson et al. | |
| 2020/0206923 A1 | 7/2020 | Pivac et al. | |
| 2020/0215692 A1 | 7/2020 | Pivac et al. | |
| 2020/0306965 A1 | 10/2020 | Nakasu et al. | |
| 2020/0306998 A1 | 10/2020 | Talebi et al. | |
| 2020/0316782 A1 | 10/2020 | Chavez et al. | |
| 2020/0324409 A1 | 10/2020 | Aguirre et al. | |
| 2020/0324412 A1 | 10/2020 | Whitman et al. | |
| 2020/0391385 A1 | 12/2020 | Oka et al. | |
| 2021/0041878 A1 | 2/2021 | Seifert et al. | |
| 2021/0205995 A1 | 7/2021 | Vu et al. | |
| 2021/0291362 A1 | 9/2021 | Pivac | |
| 2021/0293099 A1 | 9/2021 | Carnegie et al. | |
| 2021/0339390 A1 | 11/2021 | Gaschler | |
| 2021/0347046 A1 | 11/2021 | Wandzel et al. | |
| 2022/0032454 A1 | 2/2022 | Yang et al. | |
| 2022/0193898 A1 | 6/2022 | Aghasadeghi et al. | |
| 2022/0193906 A1 | 6/2022 | Barry et al. | |
| 2022/0244741 A1 | 8/2022 | da Silva et al. | |
| 2022/0260998 A1 | 8/2022 | Seifert et al. | |
| 2023/0234229 A1 | 7/2023 | Fay et al. | |
| 2024/0061436 A1 | 2/2024 | Tsuzaki et al. | |
| 2025/0196339 A1 | 6/2025 | Aghasadeghi et al. | |
| 2025/0269522 A1 | 8/2025 | Aghasadeghi et al. | |
| 2026/0109030 A1 | 4/2026 | Barry et al. | |

FOREIGN PATENT DOCUMENTS

| | | | |
|---|---|---|---|
| CN | 105488457 | B | 4/2019 |
| CN | 109682381 | | 9/2020 |
| CN | 114503042 | A | 5/2022 |
| CN | 118871258 | A | 10/2024 |
| CN | 118915722 | A | 11/2024 |
| EP | 4010771 | A1 | 6/2022 |
| EP | 4489944 | | 1/2025 |
| GB | 2598345 | A | 3/2022 |
| JP | 2003136455 | A | 5/2003 |
| JP | 2003532218 | A | 10/2003 |
| JP | 2012125871 | A | 7/2012 |
| JP | 2014087892 | A | 5/2014 |
| JP | 2019111590 | A | 7/2019 |
| JP | 2022543193 | A | 10/2022 |
| JP | 7345042 | | 9/2023 |
| KR | 20090113084 | A | 10/2009 |
| KR | 20130000496 | A | 1/2013 |
| KR | 10-2014-0040094 | A | 4/2014 |
| KR | 10-2017-0024769 | A | 3/2017 |
| KR | 10-2020-0019119 | A | 2/2020 |
| KR | 20220082805 | A | 6/2022 |
| KR | 10-2024-0164785 | A | 11/2024 |
| KR | 10-2762229 | | 1/2025 |
| PL | 224801 | B1 | 2/2017 |
| WO | WO 2010/136961 | A1 | 12/2010 |
| WO | WO 2011146259 | | 11/2011 |
| WO | WO 2020/190166 | A1 | 9/2020 |
| WO | WO 2021015868 | A1 | 1/2021 |
| WO | WO 2021025715 | A1 | 2/2021 |
| WO | WO 2022/140151 | A1 | 6/2022 |
| WO | WO 2022/140190 | A1 | 6/2022 |
| WO | WO 2022/140205 | A1 | 6/2022 |
| WO | WO 2023/140929 | A1 | 7/2023 |
| WO | WO 2023172385 | A1 | 9/2023 |

OTHER PUBLICATIONS

International Search Report and Written Opinion, PCT/US2019/057586, Feb. 3, 2020, 9 pages.

International Search Report and Written Opinion, PCT/US2023/013195, May 24, 2023, 16 pages.

Office Action received in Japanese Application No. 2022-502295 dated Mar. 16, 2023, 4 pages.

Office Action received in European Application No. 19805431.4 dated Jul. 5, 2023, 4 pages.

Notice of Allowance received in Japanese Application No. 2022-502295 dated Aug. 14, 2023, 6 pages.

Ingrid Fadelli, Researchers Enhance Human-Robot Interaction by Merging Mixed Reality and Robotics, Tech Xplore, Mar. 3, 2022, https://techxplore.com/news/2022-03-human-robot-interaction-merging-reality-robotics.amp.

Jeffrey Delmerico, Roi Poranne, Federica Gogo, Helen Oleynikova, Eric Vollenweider, Stelian Coros, Juan Nieto, Marc Pollefeys; Spatial Computing and Intuitive Interaction: Bringing Mixed Reality and Robotics Together; Feb. 3, 2022.

Dellon, et al., "Feedback Distortion to Augment Controllability of Human Limb Motion," Virtual Rehabilitation, 2008, 6 pages, https://neurobotics.cs.washington.edu/papers/3-VR2008FeedbackDistortion.pdf.

Mccoy, et al., "Virtual Sensorimotor Balance Training for Children With Fetal Alcohol Spectrum Disorders: Feasibility Study," Physical Therapy, Nov. 2015, 13 pages, https://doi.org/10.2522/ptj.20150124.

"Anybotics Introduces End-to-End Robotic Inspection Solution," video screen shots taken from https://www.youtube.com/watch?v=g3odef0EAFA, Apr. 21, 2021, downloaded Apr. 3, 2025, 16 pages.

(56) References Cited

OTHER PUBLICATIONS

"ANYmal Robots Inspecting PETRONAS' Offshore Platform (Webinar)," video screen shots taken from https://www.youtube.com/watch?v=aymdpFsdgbA, Jan. 22, 2021, downloaded Apr. 9, 2025, 19 pages.
"ANYmal X—Robotic Inspection in Ex-Rated Zones," video screen shots taken from https://vimeo.com/744482989, Aug. 30, 2022, downloaded Apr. 9, 2025, 13 pages.
"ANYmal @ ERL Emergency Robotics 2017," video screen shots taken from https://www.youtube.com/watch?v=qrJIMze_xhQ, Oct. 2, 2017, downloaded Apr. 9, 2025, 4 pages.
Anonymous, "Anybotics Introduces End-to-End Robotic Inspection Solution," https://www.anybotics.com/news/anybotics-introduces-end-to-end-robotic-inspection-solution/, Apr. 21, 2021, printed Apr. 9, 2025, 11 pages.
Anonymous, "Guide to Industrial Inspection Robots: Identifying the Task you Want to Automate," https://www.anybotics.com/news/how-to-hire-an-industrial-inspection-robot-part-1/, Mar. 21, 2023, printed Apr. 9, 2025, 15 pages.
Anonymous, "Anybotics, Cognite & Accenture Enable Real End-to-End Robotic Inspection|Solutions," https://www.anybotics.com/news/anybotics-cognite-accenture-enable-real-end-to-end-robotic-inspection-solutions/, May 30, 2022, printed Apr. 9, 2025, 13 pages.
Beetz et al., "Towards Performing Everyday Manipulation Activities". Robotics and Autonomous Systems. Sep. 30, 2010;58(9):1085-1095.
Conway et al., "Teleautonomous Systems: Projecting and coordinating intelligent action at a distance." in IEEE Trans Robot Auto. Apr. 1990; 6(2): 146-158, doi: 10.1109/70.54731.
Klamt et al., "Supervised Autonomous Locomotion and Manipulation for Disaster Response with a Centaur-like Robot". In 2018 IEEE/RSJ International Conference on Intelligent Robots and Systems (IROS) Oct. 1, 2018 (pp. 1-8).
Mittal et al., "Articulated Object Interaction in Unknown Scenes with Whole-Body Mobile Manipulation". In 2022 IEEE/RSJ Inter'l Conf Intel Robots and Syst. (IROS) Oct. 23, 2022 (pp. 1647-1654).
Nair et al., "Overcoming Exploration in Reinforcement Learning with Demonstrations", In 2018 IEEE international Conference on Robotics and Automation (ICRA) May 21, 2018 (pp. 6292-6299).
Rusu R.B., "Semantic 3D Object Maps for Everyday Manipulation in Human Living Environments Dissertation". KI-Künstliche Intelligenz. Nov. 2010;24:345-348.
Skrynnik et al., "Forgetful Experience Replay in Hierarchical Reinforcement Learning from Demonstrations", arXiv preprint arXiv:2006.09939. Jun. 17, 2020; 18 pages.
Zhu et al., "A Robotic Semantic Grasping Method for Pick-and-place Tasks". In 2019 Chinese Automation Congress (CAC) Nov. 22, 2019 (pp. 4130-4136); IEEE.
International Search Report and Written Opinion dated Apr. 4, 2022 in Application No. PCT/US2021/064105, 48 pages.
International Search Report and Written Opinion dated Apr. 12, 2022 in Application No. PCT/US2021/064236, 22 pages.
International Search Report and Written Opinion dated Mar. 25, 2022 in Application No. PCT/US2021/063776; 10 pages.
International Search Report and Written Opinion dated Mar. 23, 2023 in Application No. PCT/US2022/051066, 9 pages.
International Search Report and Written Opinion dated Mar. 27, 2025 in Application No. PCT/US2024/059801, 13 pages.
Siciliano et al., "Chapter 9—Force Control", Robotics: Modelling, Planning and Control, Dec. 2009, pp. 363-405.

* cited by examiner

SYSTEMS AND METHODS FOR ROBOTIC MANIPULATION USING EXTENDED REALITY

TECHNICAL FIELD

This disclosure relates generally to robotics and more specifically to systems, methods and apparatuses, including computer programs, for robotic manipulation using extended reality.

BACKGROUND

A robot is generally defined as a reprogrammable and multifunctional manipulator designed to move material, parts, tools, or specialized devices through variable programmed motions to perform tasks. Robots may be manipulators that are physically anchored (e.g., industrial robotic arms), mobile devices that move throughout an environment (e.g., using legs, wheels, or traction based mechanisms), or some combination of manipulator(s) and mobile device(s). Robots are utilized in a variety of industries including, for example, manufacturing, transportation, hazardous environments, exploration, and healthcare.

SUMMARY

In the last several decades, some of the world's most advanced robotics organizations have investigated various approaches to dexterous manipulation in robotics. Despite substantial effort, the useful implementations achieved to date have been limited. For example, such implementations typically cover only narrow use cases and depend heavily on accurate processing of perception data, which can vary widely in the real world. In addition, today's implementations typically require a human in the loop, e.g., to supervise the robot, identify salient environmental features to trigger desired behaviors, and/or troubleshoot when errors arise. For these reasons, dexterous manipulation in robotics has proven to be an extremely difficult capability to develop in a generic manner.

The present invention includes systems and methods to address a wide variety of use cases in robotic manipulation by integrating Extended Reality (XR) technology (e.g., virtual reality (VR), mixed reality (MR), and/or augmented reality (AR)) with robotic platform technology in novel ways. In some embodiments, an operator is provided with an XR head-mounted display (HMD), which can provide high-resolution images (e.g., color, stereo vision images collected over a wide field-of-view) of a robot's environment. In some embodiments, the HMD can track the operator's position (e.g., in six degrees of freedom), which can be provided to the robot for tracking (e.g., in a 1:1 ratio or another fixed or variable ratio). In some embodiments, the operator can use one or more remote controllers to generate commands to control the robot remotely (e.g., to move a manipulator arm of the robot and/or to move the robot in its environment). In some embodiments, an operator is presented with enriched information about the environment (e.g., depth data overlaid on camera feed data) and/or robot state information.

Such systems and methods can significantly enhance an operator's ability to generate commands for the robot to perform useful dexterous manipulations in a wide variety of real-world scenarios. When the operator is placed in a rich, high-quality, virtual representation of the robot's environment (e.g., as sensed by the robot), the operator can immediately comprehend the environment and command the robot accordingly (e.g., as if s/he were standing behind and/or above the robot). In this way, the operator can leverage human-level situational awareness, cognition, and/or sensory processing to understand the context required to provide a suitable set of commands. In some embodiments, the operator can gain further context by walking around a virtual scene to observe the robot from a variety of angles. In some embodiments, the operator can directly control the manipulator as if it were his/her own arm and/or hand (e.g., using hand tracking hardware). In some embodiments, rich panoramic camera data can be displayed naturally over the HMD (e.g., instead of only flat, equi-rectangular images).

Such systems and methods can enable dexterous robotic manipulation to be exploited at a high level of generality, reliability and functionality without needing to solve problems that have to date proven largely intractable. In some embodiments, the robot can learn over time from user data and/or accelerate its behavior development. In some embodiments, piloting the robot from an XR interface can provide better situational awareness even without a manipulator installed. In some embodiments, remote operator controls can work hand-in-hand with autonomy methods (e.g., by using autonomy where possible and/or reliable, and having the operator address the remaining scenarios). In some embodiments, the operator can set discrete and/or continuous waypoints using the XR interface (e.g., using a previously generated map displayed on the XR device and/or via direct interaction at the location of interest), which the robot can store and/or play back at a later time. In some embodiments the waypoints can correspond to body positions and/or gripper positions of the robot.

In one aspect, the invention features a method of controlling a robot. The method includes receiving, by a computing device, from one or more sensors, sensor data reflecting an environment of the robot. The one or more sensors are configured to span a field of view of at least 150 degrees with respect to a ground plane of the robot. The method includes providing, by the computing device, video output to an extended reality (XR) display usable by an operator of the robot. The video output reflects the environment of the robot. The method includes receiving, by the computing device, movement information reflecting movement by the operator of the robot. The method includes controlling, by the computing device, the robot to move based on the movement information.

In some embodiments, the one or more sensors include one or more cameras. In some embodiments, the sensor data includes video input. In some embodiments, the sensor data includes three dimensional data. In some embodiments, the sensor data is received in real-time and the video output is provided in real-time. In some embodiments, the movement information is received in real-time and the controlling is performed in real-time. In some embodiments, the video output is provided in a first time interval. In some embodiments, the controlling is performed in a second time interval. In some embodiments, the first and second time intervals are separated by a planning period.

In some embodiments, the method includes receiving, by the computing device, one or more commands from the operator of the robot. In some embodiments, controlling the robot to move includes controlling a manipulator of the robot to move. In some embodiments, controlling the robot to move includes controlling the robot to move relative to the environment. In some embodiments, controlling the robot to move includes controlling the robot to move an absolute position of the robot based on a map of the environment. In some embodiments, controlling the robot to move includes controlling the robot to grasp an object by specifying a location of the object, the robot determining a suitable combination of locomotion by the robot and movement by a manipulator of the robot.

In some embodiments, the manipulator includes an arm portion and a joint portion. In some embodiments, controlling the robot to move includes identifying, based on the movement information, a joint center of motion of the operator. In some embodiments, controlling the robot to move includes controlling the manipulator to move relative to a point on the manipulator that corresponds to the joint center of motion of the operator. In some embodiments, controlling the robot to move includes mapping a workspace of the operator to a workspace of a manipulator of the robot. In some embodiments, controlling the robot to move includes generating a movement plan in the workspace of the manipulator based on a task-level result to be achieved, the movement plan reflecting an aspect of motion that is different from that reflected in the movement information.

In some embodiments, the one or more sensors include one or more depth sensing cameras. In some embodiments, the one or more sensors are configured to span a field of view of at least 170 degrees. In some embodiments, the extended reality display is a head mounted display (HMD). In some embodiments, the extended reality display is an augmented reality (AR) display. In some embodiments, the extended reality display is a virtual reality (VR) display. In some embodiments, the extended reality display tracks movements by the operator in at least six degrees of freedom. In some embodiments, extended reality display enables virtual panning. In some embodiments, the extended reality display enables virtual tilting.

In some embodiments, the one or more sensors are included on the robot. In some embodiments, the one or more sensors are remote from the robot. In some embodiments, the computing device is included on the robot. In some embodiments, the computing device is remote from the robot. In some embodiments, the computing device is in electronic communication with at least two robots. In some embodiments, the computing device is configured to control the at least two robots to move in coordination. In some embodiments, controlling the robot to move includes controlling the robot to perform a gross motor task, the robot determining supporting movements based on sensor data from the environment.

In some embodiments, controlling the robot to move includes generating robot movements that track movements by the operator in Cartesian coordinate space. In some embodiments, the robot movements track the movements by the operator on a 1:1 length scale. In some embodiments, the robot movements track the movements by the operator on a fixed ratio length scale. In some embodiments, the robot movements include a change in at least one of position and orientation. In some embodiments, controlling the robot to move includes generating movements based on a click-and-drag motion by the operator. In some embodiments, controlling the robot to move includes generating a manipulation plan based on the movement information. In some embodiments, controlling the robot to move includes generating a locomotion plan based on the manipulation plan.

In some embodiments, the video output reflects depth perception data from the environment of the robot. In some embodiments, the method includes receiving robot state information from the robot. In some embodiments, the video output reflects state information of the robot. In some embodiments, the video output includes a visual representation of the robot usable by the operator for a manipulation task. In some embodiments, controlling the robot to move includes utilizing a force control mode if an object is detected to be in contact with a manipulator of the robot. In some embodiments, controlling the robot to move includes utilizing a low-force mode or no-force mode if no object is detected to be in contact with the manipulator. In some embodiments, controlling the robot to move includes generating a “snap-to” behavior for a manipulator of the robot.

In some embodiments, the robot is omnidirectional. In some embodiments, the robot is a quadruped robot. In some embodiments, the robot is a biped robot. In some embodiments, the robot is a wheeled robot. In some embodiments, the movement information includes three position coordinates and three orientation coordinates as functions of time. In some embodiments, controlling the robot to move includes determining, based on the movement information, a pose of the robot in the environment relative to a fixed virtual anchor. In some embodiments, controlling the robot to move includes determining, based on the movement information, robot steering instructions based on a location of the operator relative to a distance from a virtual anchor location. In some embodiments, the robot steering instructions include one or more target velocities. In some embodiments, the robot steering instructions are received from one or more remote controllers usable by the operator. In some embodiments, the robot steering instructions are generated by manipulating a virtual slave of the robot. In some embodiments, controlling the robot to move is based on a voice command issued by the operator. In some embodiments, the method further comprises selecting based at least in part, on the movement information, one or more components of the robot to move, and controlling the robot to move comprises controlling the robot to move the selected one or more components of the robot. In some embodiments, the method further comprises selecting based at least in part, on the movement information, a display mode to display the video output, wherein the display mode is a mixed reality mode or a virtual reality mode, and providing video output to an extended reality (XR) display comprises providing the video output to the XR display in accordance with the selected display mode.

In another aspect, the invention features a system. The system includes a robot. The system includes one or more sensors in communication with the robot. The one or more sensors are configured to span a field of view of at least 150 degrees with respect to a ground plane of the robot. The system includes a computing device. The computing device is configured to receive, from the one or more sensors, sensor data reflecting an environment of the robot. The computing device is configured to provide video output to an extended reality (XR) display usable by an operator of the robot, the video output reflecting the environment of the robot. The computing device is configured to receive movement information reflecting movement by the operator of the robot. The computing device is configured to control the robot to move based on the movement information.

In some embodiments, the one or more sensors include one or more cameras. In some embodiments, the sensor data includes video input. In some embodiments, the sensor data includes three dimensional data. In some embodiments, the sensor data is received in real-time and the video output is provided in real-time. In some embodiments, the movement information is received in real-time and the control is performed in real-time. In some embodiments, the video output is provided in a first time interval. In some embodiments, the control is performed in a second time interval. In some embodiments, the first and second time intervals separated by a planning period.

In some embodiments, the computing device receives one or more commands from the operator of the robot. In some embodiments, the computing device is configured to control a manipulator of the robot to move. In some embodiments, the computing device is configured to control the robot to move relative to the environment. In some embodiments, the computing device is configured to control the robot to move an absolute position of the robot based on a map of the environment. In some embodiments, the computing device is configured to control the robot to grasp an object by specifying a location of the object. In some embodiments, the robot determines a suitable combination of locomotion by the robot and movement by a manipulator of the robot.

In some embodiments, the manipulator includes an arm portion and a joint portion. In some embodiments, the computing device is configured to identify, based on the movement information, a joint center of motion of the operator. In some embodiments, the computing device is configured to control the manipulator to move relative to a point on the manipulator that corresponds to the joint center of motion of the operator. In some embodiments, the computing device is configured to map a workspace of the operator to a workspace of a manipulator of the robot. In some embodiments, the computing device is configured to generate a movement plan in the workspace of the manipulator based on a task-level result to be achieved. In some embodiments, the movement plan reflects an aspect of motion that is different from that reflected in the movement information.

In some embodiments, the one or more sensors include one or more depth sensing cameras. In some embodiments, the one or more sensors are configured to span a field of view of at least 170 degrees. In some embodiments, the system includes the extended reality (XR) display in communication with the computing device. In some embodiments, the extended reality display is a head mounted display (HMD). In some embodiments, the extended reality display is an augmented reality (AR) display. In some embodiments, the extended reality display is a virtual reality (VR) display. In some embodiments, the extended reality display tracks movements by the operator in at least six degrees of freedom. In some embodiments, the extended reality display enables virtual panning. In some embodiments, the extended reality display enables virtual tilting.

In some embodiments, the one or more sensors are included on the robot. In some embodiments, the one or more sensors are remote from the robot. In some embodiments, the computing device is included on the robot. In some embodiments, the computing device is remote from the robot. In some embodiments, the computing device is in electronic communication with at least two robots. In some embodiments, the computing device is configured to control the at least two robots to move in coordination. In some embodiments, the computing device is configured to control the robot to perform a gross motor task. In some embodiments, the robot determining supporting movements based on sensor data from the environment.

In some embodiments, the computing device is configured to generate robot movements that track movements by the operator in Cartesian coordinate space. In some embodiments, the robot movements track the movements by the operator on a 1:1 length scale. In some embodiments, the robot movements track the movements by the operator on a fixed ratio length scale. In some embodiments, the robot movements include a change in at least one of position and orientation. In some embodiments, the computing device is configured to generate robot movements based on a click-and-drag motion by the operator. In some embodiments, the computing device is configured to generate a manipulation plan based on the movement information and generate a locomotion plan based on the manipulation plan.

In some embodiments, the video output reflects depth perception data from the environment of the robot. In some embodiments, the computing device is configured to receive robot state information from the robot. In some embodiments, the video output reflects state information of the robot. In some embodiments, the video output includes a visual representation of the robot usable by the operator for a manipulation task. In some embodiments, the computing device is configured to control the robot to move by utilizing a force control mode if an object is detected to be in contact with a manipulator of the robot. In some embodiments, the computing device is configured to control the robot to move by utilizing a low-force mode or no-force mode if no object is detected to be in contact with the manipulator. In some embodiments, the computing device is configured to generate a "snap-to" behavior for a manipulator of the robot.

In some embodiments, the robot is omnidirectional. In some embodiments, the robot is a quadruped robot. In some embodiments, the robot is a biped robot. In some embodiments, the robot is a wheeled robot. In some embodiments, the movement information includes three position coordinates and three orientation coordinates as functions of time. In some embodiments, the computing device is configured to determine, based on the movement information, a pose of the robot in the environment relative to a fixed virtual anchor. In some embodiments, the computing device is configured to determine, based on the movement information, robot steering instructions based on a location of the operator relative to a distance from a virtual anchor location. In some embodiments, the robot steering instructions include one or more target velocities. In some embodiments, the robot steering instructions are received from one or more remote controllers usable by the operator. In some embodiments, the robot steering instructions are generated by manipulating a virtual slave of the robot. In some embodiments, the computing device is configured to control the robot to move based on a voice command issued by the operator. In some embodiments, the computing device is configured to select based at least in part, on the movement information, one or more components of the robot to move, and controlling the robot to move comprises controlling the robot to move the selected one or more components of the robot.

In another aspect, the invention features a method of controlling a robot remotely. The method includes receiving, by a computing device, movement information from an operator of the robot. The method includes identifying, by the computing device, based on the movement information, a joint center of motion of the operator. The method includes controlling, by the computing device, a manipulator of the robot to move relative to a point on the manipulator that corresponds to the joint center of motion of the operator.

In another aspect, the invention features a robot. The robot comprises a computing device configured to receive, from one or more sensors configured to have a field of view that spans at least 150 degrees with respect to a ground plane of the robot, sensor data reflecting an environment of the robot, provide video output to an extended reality (XR) display usable by an operator of the robot, the video output reflecting the environment of the robot, receive movement information reflecting movement by the operator of the robot, and control the robot to move based on the movement information.

In another aspect, the invention features a method of controlling a robot. The method includes receiving, by a computing device, from one or more sensors, sensor data reflecting an environment of the robot. The one or more sensors are configured to span a field of view of at least 150 degrees with respect to a ground plane of the robot. The method includes providing, by the computing device, video output to an extended reality (XR) display usable by an operator of the robot. The video output reflects the environment of the robot. The method includes receiving, by the computing device, movement information reflecting movement by the operator of the robot. The method includes controlling, by the computing device, an operation of the robot based on the movement information.

In some embodiments, the operation of the robot includes a movement operation of the robot. In some embodiments, the operation of the robot includes a non-movement operation of the robot. In some embodiments, the non-movement operation of the robot includes activation or deactivation of at least a portion of one or more systems or components of the robot. In some embodiments, the one or more systems or components of the robot includes at least one camera sensor. In some embodiments, the operation of the robot includes a movement operation of the robot and a non-movement operation of the robot. In some embodiments, controlling operation of the operation of the robot includes simultaneously controlling a movement operation and a non-movement operation of the robot. In some embodiments, simultaneously controlling a movement operation and a non-movement operation of the robot comprises activating a camera sensor to capture at least one image while moving at least a portion of the robot.

In another aspect, the invention features a robot. The robot comprises one or more camera sensors configured to have a field of view that spans at least 150 degrees with respect to a ground plane of the robot and a computing device. The computing device is configured to receive, from the one or more camera sensors, image data reflecting an environment of the robot, provide video output to an extended reality (XR) display usable by an operator of the robot, the video output including information based on the image data reflecting the environment of the robot, receive movement information reflecting movement by the operator of the robot, and control the robot to move based on the movement information.

In some embodiments, the computing device is configured to provide the video output to the XR display in a first time interval, and control the robot to move in a second time interval, the first and second time intervals separated by a planning period. In some embodiments, the robot further comprises a manipulator, and controlling the robot to move includes controlling the robot to grasp an object in the environment of the robot by specifying a location of the object, the robot determining a suitable combination of locomotion by the robot and movement by the manipulator of the robot to grasp the object. In some embodiments, the manipulator includes an arm portion and a joint portion. In some embodiments, the controlling the robot to move comprises identifying, based on the movement information, a joint center of motion of the operator, and controlling the manipulator to move relative to a point on the manipulator that corresponds to the joint center of motion of the operator.

In some embodiments, the robot comprises a manipulator, wherein controlling the robot to move comprises mapping a workspace of the operator to a workspace of the manipulator. In some embodiments, controlling the robot to move comprises generating a movement plan in the workspace of the manipulator based on a task-level result to be achieved, the movement plan reflecting an aspect of motion that is different from that reflected in the movement information. In some embodiments, the robot is a first robot, the computing device is in electronic communication with the first robot and a second robot, and the computing device is configured to control the first robot and the second robot to move in coordination. In some embodiments, controlling the robot to move comprises generating a manipulation plan based on the movement information and generating a locomotion plan based on the manipulation plan. In some embodiments, the robot comprises a manipulator, and controlling the robot to move comprises utilizing a force control mode if an object is detected to be in contact with the manipulator of the robot, utilizing a low-force mode or no-force mode if no object is detected to be in contact with the manipulator.

In another aspect, the invention features a method of controlling a robot. The method comprises receiving, by a computing device, from one or more camera sensors, image data reflecting an environment of the robot, the one or more camera sensors configured to have a field of view that spans at least 150 degrees with respect to a ground plane of the robot, providing, by the computing device, video output to an extended reality (XR) display usable by an operator of the robot, the video output including information based on the image data reflecting the environment of the robot, receiving, by the computing device, movement information reflecting movement by the operator of the robot, and controlling, by the computing device, the robot to move based on the movement information.

In some embodiments, the video output is provided in a first time interval, and the controlling is performed in a second time interval, the first and second time intervals separated by a planning period. In some embodiments, controlling the robot to move includes controlling the robot to grasp an object by specifying a location of the object, the robot determining a suitable combination of locomotion by the robot and movement by a manipulator of the robot to grasp the object. In some embodiments, the manipulator includes an arm portion and a joint portion. In some embodiments, controlling the robot to move comprises identifying, based on the movement information, a joint center of motion of the operator, and controlling the manipulator to move relative to a point on the manipulator that corresponds to the joint center of motion of the operator.

In some embodiments, controlling the robot to move comprises mapping a workspace of the operator to a workspace of a manipulator of the robot. In some embodiments, controlling the robot to move includes generating a movement plan in the workspace of the manipulator based on a task-level result to be achieved, the movement plan reflecting an aspect of motion that is different from that reflected in the movement information. In some embodiments, the robot is a first robot, the computing device is in electronic communication with a second robot, and the computing device is configured to control the first robot and the second robot to move in coordination. In some embodiments, controlling the robot to move comprises generating a manipulation plan based on the movement information and generating a locomotion plan based on the manipulation plan. In some embodiments, controlling the robot to move comprises utilizing a force control mode if an object is detected to be in contact with a manipulator of the robot, and utilizing a low-force mode or no-force mode if no object is detected to be in contact with the manipulator.

In another aspect, the invention features a system. The system comprises a robot, one or more camera sensors configured to have a field of view that spans at least 150 degrees with respect to a ground plane of the robot, an extended reality (XR) system including an XR display and at least one XR controller, and a computing device. The computing device is configured to receive, from the one or more camera sensors, image data reflecting an environment of the robot, provide video output to the XR display usable by an operator of the robot, the video output including information based on the image data reflecting the environment of the robot, receive, from the at least one XR controller, movement information reflecting movement by the operator of the robot, and control the robot to move based on the movement information.

In some embodiments, the computing device is configured to provide the video output to the XR display in a first time interval, and control the robot to move in a second time interval, the first and second time intervals separated by a planning period. In some embodiments, the robot comprises a manipulator, and wherein controlling the robot to move includes controlling the robot to grasp an object in the environment of the robot by specifying a location of the object, the robot determining a suitable combination of locomotion by the robot and movement by the manipulator of the robot to grasp the object. In some embodiments, the manipulator includes an arm portion and a joint portion. In some embodiments, controlling the robot to move comprises identifying, based on the movement information, a joint center of motion of the operator, and controlling the manipulator to move relative to a point on the manipulator that corresponds to the joint center of motion of the operator.

In some embodiments, the robot comprises a manipulator, wherein controlling the robot to move comprises mapping a workspace of the operator to a workspace of the manipulator. In some embodiments, controlling the robot to move comprises generating a movement plan in the workspace of the manipulator based on a task-level result to be achieved, the movement plan reflecting an aspect of motion that is different from that reflected in the movement information. In some embodiments, the robot is a first robot, the system further comprises a second robot, the computing device is in electronic communication with the first robot and the second robot, and the computing device is configured to control the first robot and the second robot to move in coordination. In some embodiments, controlling the robot to move comprises generating a manipulation plan based on the movement information and generating a locomotion plan based on the manipulation plan. In some embodiments, the robot comprises a manipulator, and controlling the robot to move comprises utilizing a force control mode if an object is detected to be in contact with the manipulator of the robot, and utilizing a low-force mode or no-force mode if no object is detected to be in contact with the manipulator.

In some embodiments, a virtual pan/tilt feature is provided (e.g., with no hardware gimbal required). In some embodiments, a software controller allows an operator access to a manipulator workspace (e.g., even where a human's anthropometry and/or range of motion may not match that of the robot manipulator). In some embodiments, a software controller identifies a joint (e.g., wrist) center of motion of the operator and/or uses this point to provide a commanded motion to a joint (e.g., wrist) of a robotic manipulator, leading to natural intuitive end effector motion and avoiding unintended movements (e.g., by a manipulator arm). In some embodiments, a software controller allows an operator to perform gross motor tasks while the robot automatically performs high rate reflexive responses (e.g., based on environmental contact).

In some embodiments, the systems and methods herein lay a foundation for next-generation robot behavior development for many use cases, including but not limited to: collaborative behavior between robots; "snap-to" behaviors driven by human reasoning; non-prehensile manipulation; virtual tourism; and tele-presence applications. In one exemplary use case, a mobile (e.g., wheeled) manipulator robot can be configured to unload boxes from a truck in a warehouse. If the robot stops while unloading boxes, an operator may not be able to enter the robot's area immediately to assist (e.g., due to safety concerns and/or practical constraints). On the other hand, an operator can immediately be placed inside a corresponding virtual scene and act as if s/he were there to remove a jammed box using tele-manipulation. In such a situation, the operator can understand the physical context immediately and be able to assess aberrant or unusual situations, quickly devising a solution that would be challenging for a robot to discover alone. In another exemplary use case, a robot may encounter unknown obstacles in a disaster area that require human environmental reasoning to be successfully navigated. Numerous examples are possible, and the disclosure is not limited to any particular example or application.

BRIEF DESCRIPTION OF DRAWINGS

The advantages of the invention, together with further advantages, may be better understood by referring to the following description taken in conjunction with the accompanying drawings. The drawings are not necessarily to scale, and emphasis is instead generally placed upon illustrating the principles of the invention.

Like reference symbols in the various drawings indicate like elements.

DETAILED DESCRIPTION

Figure 1A:
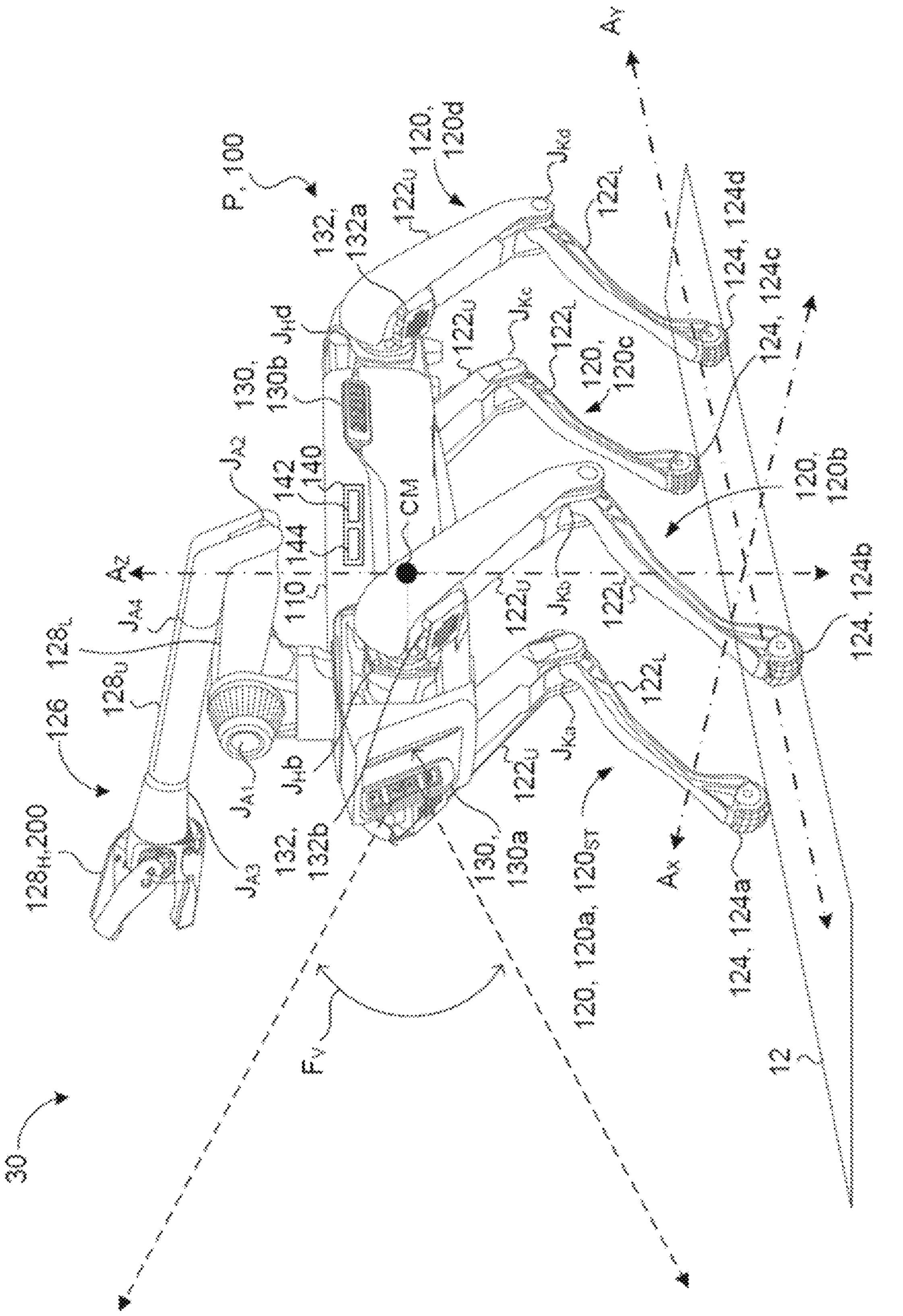
FIG. 1A is a schematic view of an example robot with a gripper mechanism.
Figure 1B:
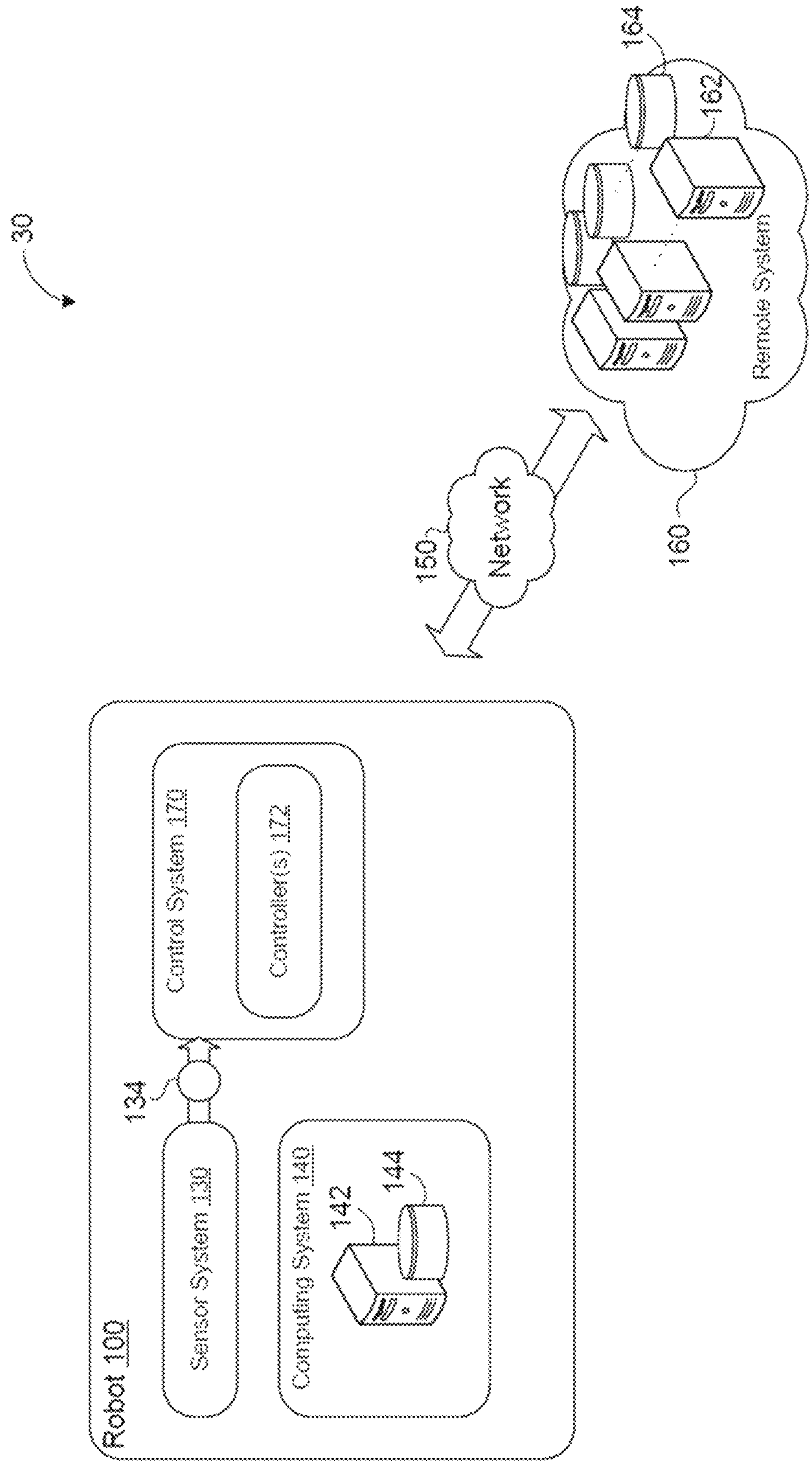
FIG. 1B is a schematic view of example system of the robot of FIG. 1A.

Referring to FIGS. 1A and 1B, the robot 100 includes a body 110 with locomotion based structures such as legs 120*a-d* coupled to the body 110 that enable the robot 100 to move about the environment 30. In some examples, each leg 120 is an articulable structure such that one or more joints J permit members 122 of the leg 120 to move. For instance, each leg 120 includes a hip joint $J_H$ coupling an upper member 122, 122*u* of the leg 120 to the body 110 and a knee joint $J_K$ coupling the upper member $\mathbf{122}_U$ of the leg 120 to a lower member $\mathbf{122}_L$ of the leg 120. Although FIG. 1A depicts a quadruped robot with four legs 120*a-d*, the robot 100 may include any number of legs or locomotive based structures (e.g., a biped or humanoid robot with two legs, or other arrangements of one or more legs) that enable the robot 100 to traverse the terrain within the environment 30.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint JA such that the distal end 124 is articulable with respect to the lower member $\mathbf{122}_L$ of the leg 120.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $\mathbf{128}_L$, an upper member $\mathbf{128}_U$, and a hand member $\mathbf{128}_H$ (e.g., shown as a mechanical gripper 200). Here, the lower member $\mathbf{128}_L$ may rotate or pivot about a first arm joint $J_{A1}$ located adjacent to the body 110 (e.g., where the arm 126 connects to the body 110 of the robot 100). The lower member $\mathbf{128}_L$ is coupled to the upper member $\mathbf{128}_U$ at a second arm joint $J_{A2}$ and the upper member $\mathbf{128}_U$ is coupled to the hand member $\mathbf{128}_H$ at a third arm joint $J_{A3}$. In some examples, such as FIG. 1A, the hand member $\mathbf{128}_H$ is a mechanical gripper 200 that is configured to perform different types of grasping of elements within the environment 30. In some implementations, the arm 126 additionally includes a fourth joint $J_{A4}$. The fourth joint $J_{A4}$ may be located near the coupling of the lower member $\mathbf{128}_L$ to the upper member $\mathbf{128}_U$ and function to allow the upper member $\mathbf{128}_U$ to twist or rotate relative to the lower member $\mathbf{128}_L$. In other words, the fourth joint $J_{A4}$ may function as a twist joint similarly to the third joint $J_{A3}$ or wrist joint of the arm 128 adjacent the hand member $\mathbf{128}_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 may attach or detach from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis Ax and the y-direction axis $A_Y$. The ground plane refers to a ground surface 12 where distal ends 124 of the legs 120 of the robot 100 may generate traction to help the robot 100 move about the environment 30. Another anatomical plane of the robot 100 is the frontal plane that extends across the body 110 of the robot 100 (e.g., from a left side of the robot 100 with a first leg 120*a* to a right side of the robot 100 with a second leg 120*b*). The frontal plane spans the X-Z plane by extending in directions of the x-direction axis Ax and the z-direction axis $A_Z$.

In order to maneuver about the environment 30 or to perform tasks using the arm 126, the robot 100 includes a sensor system 130 with one or more sensors 132, 132*a*— n (e.g., shown as a first sensor 132, 132*a* and a second sensor 132, 132*b*). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some examples, the sensor 132 has a corresponding field(s) of view $F_v$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

When surveying a field of view $F_V$ with a sensor 132, the sensor system 130 generates sensor data 134 (also referred to as image data) corresponding to the field of view $F_V$. In some examples, the sensor data 134 is image data that corresponds to a three-dimensional volumetric point cloud generated by a three-dimensional volumetric image sensor 132. Additionally or alternatively, when the robot 100 is maneuvering about the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 about the robot 100.

In some implementations, the sensor system 130 includes sensor(s) 132 coupled to a joint J. Moreover, these sensors 132 may couple to a motor M that operates a joint J of the robot 100 (e.g., sensors 132, 132*a-b*). Here, these sensors 132 generate joint dynamics in the form of joint-based sensor data 134. Joint dynamics collected as joint-based sensor data 134 may include joint angles (e.g., an upper member $\mathbf{122}_U$ relative to a lower member $\mathbf{122}_L$ or hand member 126H relative to another member of the arm 126 or robot 100), joint speed (e.g., joint angular velocity or joint angular acceleration), and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J) and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 is configured to store, process, and/or to communicate the sensor data 134 to various systems of the robot 100 (e.g., the control system 170 and/or the maneuver system 300). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., a motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). The remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170. The control system 170 may be configured to communicate with systems of the robot 100, such as the sensor system 130. The control system 170 may perform operations and other functions using computing system 140. The control system 170 includes at least one controller 172 that is configured to control the robot 100. For example, the controller 172 controls movement of the robot 100 to traverse about the environment 30 based on input or feedback from the systems of the robot 100 (e.g., the sensor system 130 and/or the control system 170). In additional examples, the controller 172 controls movement between poses and/or behaviors of the robot 100. At least one the controller 172 may be responsible for controlling movement of the arm 126 of the robot 100 in order for the art 126 to perform various tasks using the gripper 200. For instance, at least one controller 172 controls a gripper actuator 300 that operates the gripper 200 to manipulate an object or element in the environment 30.

A given controller 172 may control the robot 100 by controlling movement about one or more joints J of the robot 100. In some configurations, the given controller 172 is implemented as software with programming logic that controls at least one joint J or a motor M which operates, or is coupled to, a joint J. For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member 128$_H$ or gripper 200) of the robot 100. By controlling one or more joints J, actuators (e.g., the actuator 300), or motors M, the controller 172 may coordinate movement for all different parts of the robot 100 (e.g., the body 110, one or more legs 120, the arm 126). For example, to perform some movements or tasks, a controller 172 may be configured to control movement of multiple parts of the robot 100 such as, for example, two legs 120*a*— b, four legs 120*a*—d, or two legs 120*a*—b combined with the arm 126.

Figure 2:
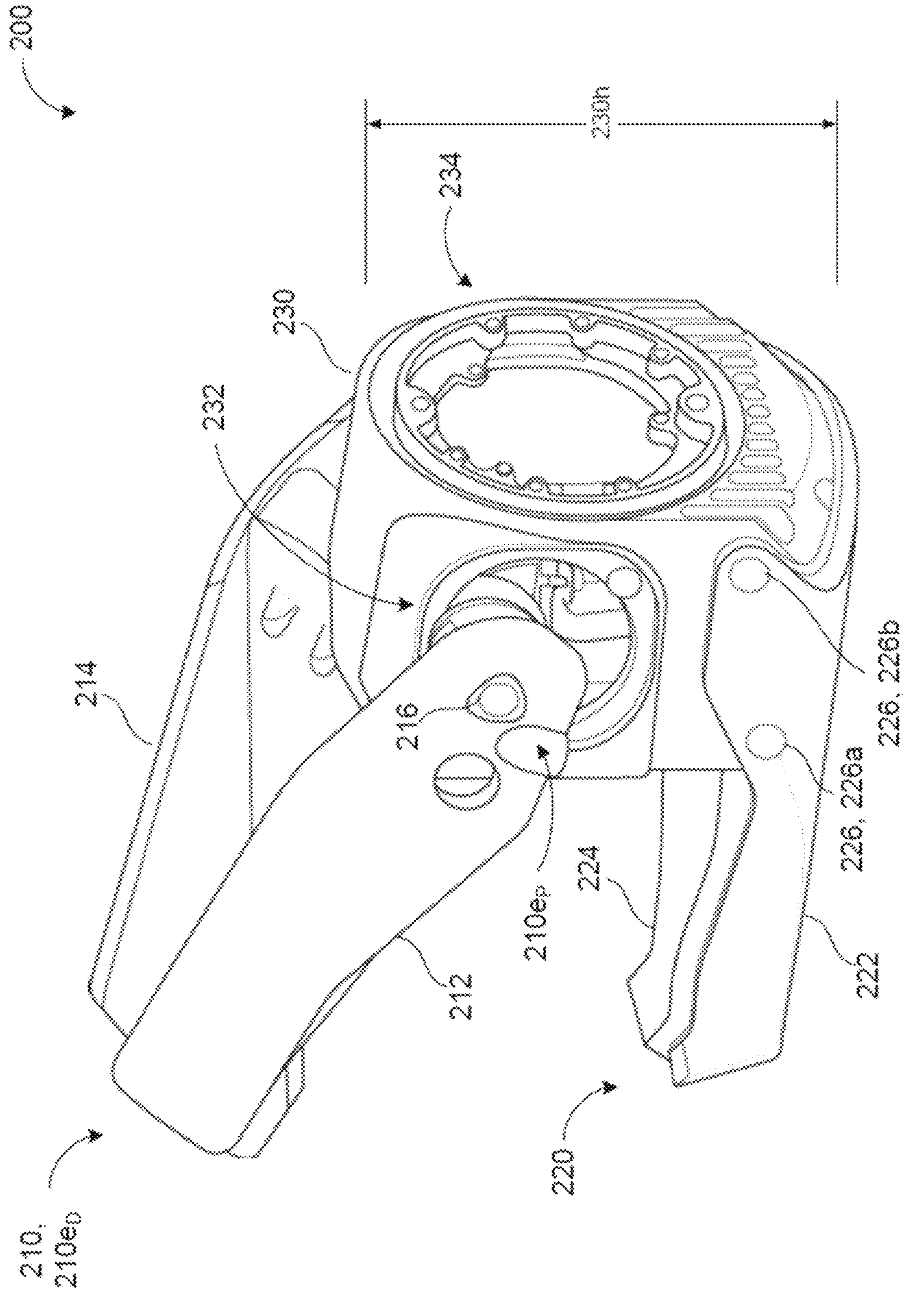
FIG. 2 is a perspective view of the example gripper mechanism of FIG. 1A.

In some examples, the end effector of the arm 126 is a mechanical gripper 200 (also referred to as a gripper 200). Generally speaking, a mechanical gripper is a type of end effector for a robotic manipulator that may open and/or close on a workpiece that is an element or object within the environment 30. When a mechanical gripper closes on a workpiece, jaws of the mechanical gripper generate a compressive force that grasps or grips the workpiece. Typically, the compressive force is enough force to hold the workpiece (e.g., without rotating or moving) within a mouth between the jaws of the gripper. Referring to FIG. 2, the gripper 200 includes a top jaw 210 and a bottom jaw 220 configured to grasp or to grip an object in order to manipulate the object to perform a given task. Although each jaw 210, 220 of the gripper 200 may be configured to actuate in order to compress the jaws 210, 220 against an object, the gripper 200 of FIG. 2 illustrates the top jaw 210 that is a movable jaw to pivot about a pivot point and a bottom jaw 220 that is a fixed jaw. Therefore, the top jaw 210 may move up or down as it rotates about pivot point. Colloquially speaking, the mouth of the gripper 200 refers to the space between the top jaw 210 and a bottom jaw 220. As the movable top jaw 210 rotates downward toward the fixed bottom jaw 220, the mouth of the gripper 200 closes and the movable top jaw 210 may compress an object into the fixed bottom jaw 220 when the object is located in the mouth of the gripper 200. The top jaw 210 includes a proximal end 210$e_p$ located adjacent to the pivot point for the top jaw 210 and a distal end 210$e_d$ opposite the proximal end 210$e_p$. In some examples, the top jaw 210 includes a first side frame 212 and a second side frame 214. The first side frame 212 may be arranged such that a plane corresponding to the surface of the first side frame 212 converges with a plane corresponding to a surface of the second side frame 214 at the distal end 210$e_d$ of the top jaw 210 to resemble the jaw-like structure of the top jaw 210. Here, the first side frame 212 and the second side frame 214 converge or mechanically come together in some manner at the distal end 210$e_d$ of the top jaw 210. In some examples, at the proximal end 210$e_p$ of the top jaw 210, the top jaw 210 includes a top jaw pin 216 that is configured to allow the top jaw 210 to rotate about an axis of the top jaw pin 216 and also couple to a gripper actuator 300, such that the gripper actuator 300 may drive the top jaw 210 along its range of motion (e.g., an arched range of motion to open and/or to close the mouth of the gripper 200).

In some implementations, the top jaw pin 216 couples the top jaw 210 to an actuator housing 230 that houses the gripper actuator 300. The actuator housing 230 may include an opening 232 to receive the top jaw 210 in order to allow the top jaw 210 to pivot about the axis of the top jaw pin 216. In other words, the opening 232 is a hole in a side wall of the housing 230 where the hole aligns with the axis of the top jaw pin 216. In some configurations, a top jaw pin 216 as a single pin that extends from the first side frame 212 to the second side frame 214 through a first and a second opening 232 on each side of the housing 230. In other configurations, each side frame 212, 214 may have its own top jaw pin 216 where the top jaw pin 216 of the first side frame 212 is coaxial with the top jaw pin 216 of the second side frame 214. In some configurations, the actuator housing 230 includes a connector socket 234. The connector socket 234 is configured allow the gripper 200 to couple (or decouple) with part of the arm 126 that includes a mating socket to match the connector socket 234.

In some examples, the connector housing 230 has a height 230*h* that extends from the top jaw 210 to the bottom jaw 220. For example, the fixed jaw or bottom jaw 220 attaches to the connector housing 230 at an end of the connector housing 230 opposite the top jaw 210. For instance, FIG. 2 depicts the bottom jaw 220 affixed to the connector housing 230 by at least one bottom jaw pin 226 (e.g., shown as a first bottom jaw pin 226, 226*a* and a second bottom jaw pin 226, 226*b*).

When the gripper 200 grips an object, the object may impart reaction forces on the gripper 200 proportional to the compressive force of the gripper 200. Depending on the shape of the object, one side of the gripper 200 may experience a greater reaction force than another side of the gripper 200. Referring to the construction of the gripper depicted in FIG. 2, this means that the first side frame 212 may experience a different reaction force than the second side frame 214. With a different reaction force between the first side frame 212 and the second side frame 214, the reaction force will inherently impart some amount of torque at the top jaw pin 216. Since the top jaw pin 216 couples the top jaw 210 to a gripper actuator 300, the gripper actuator 300 also receives some portion of this torque. Unfortunately, the gripper actuator 300 may move the top jaw 210 by translating linear motion of the gripper actuator 300 into rotational motion. When the linear motion of the gripper actuator 300 occurs along a linear path, the amount of torque experienced by the gripper actuator 300 resulting from the reaction forces on the gripper 200 introduces stress to the gripper actuator 300. When the gripper actuator 300 includes a linear actuator such as a linear ball screw, the stress that the torque introduces may stress the threads of the screw shaft; potentially even causing the drive member of the linear actuator to bind against the threads of the screw shaft. This problem may be even more detrimental to the operation of the gripper actuator 300 when the gripper actuator 300 uses a linear actuator with high precision that has fine pitched threads along the screw shaft. In other words, the fine pitch of the threads may increase the likelihood of wear or binding due to the torque imparted by the reaction forces.

Figure 3A:
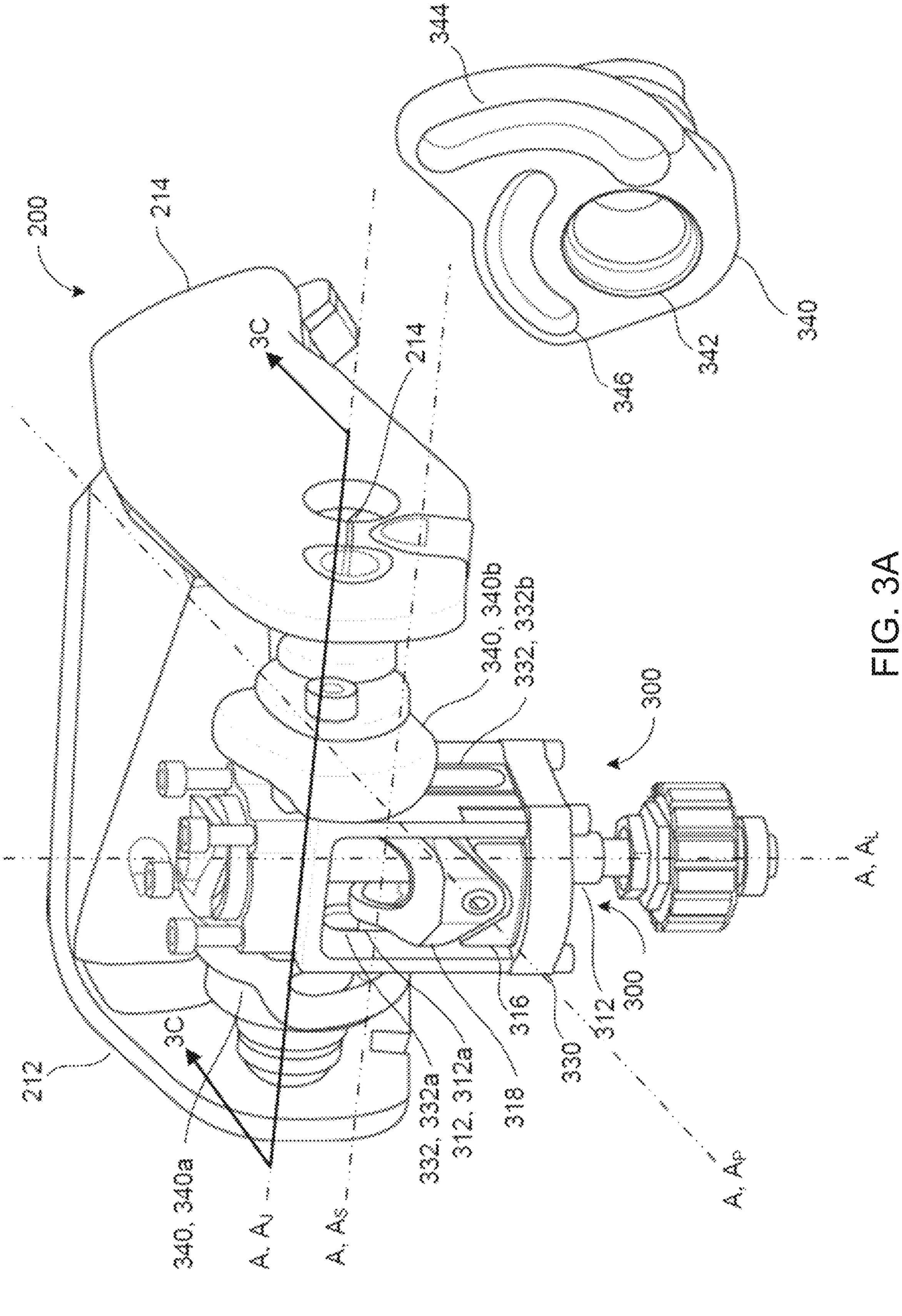
FIG. 3A is a perspective view of an example jaw actuator for the gripper mechanism of FIG. 2.
Figure 3B:
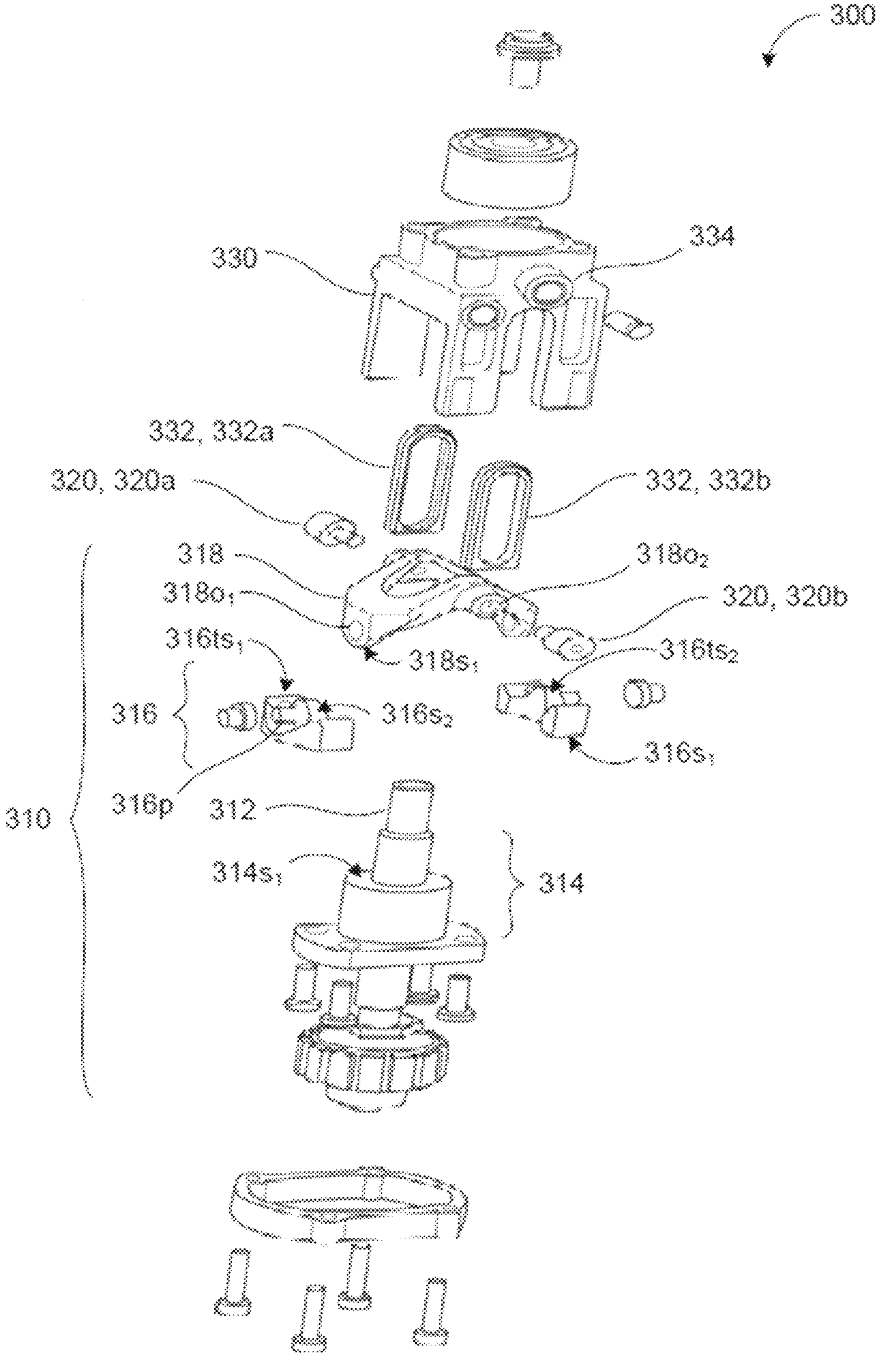
FIG. 3B is an exploded view of the jaw actuator for the gripper mechanism of FIG. 2.
Figure 3C:
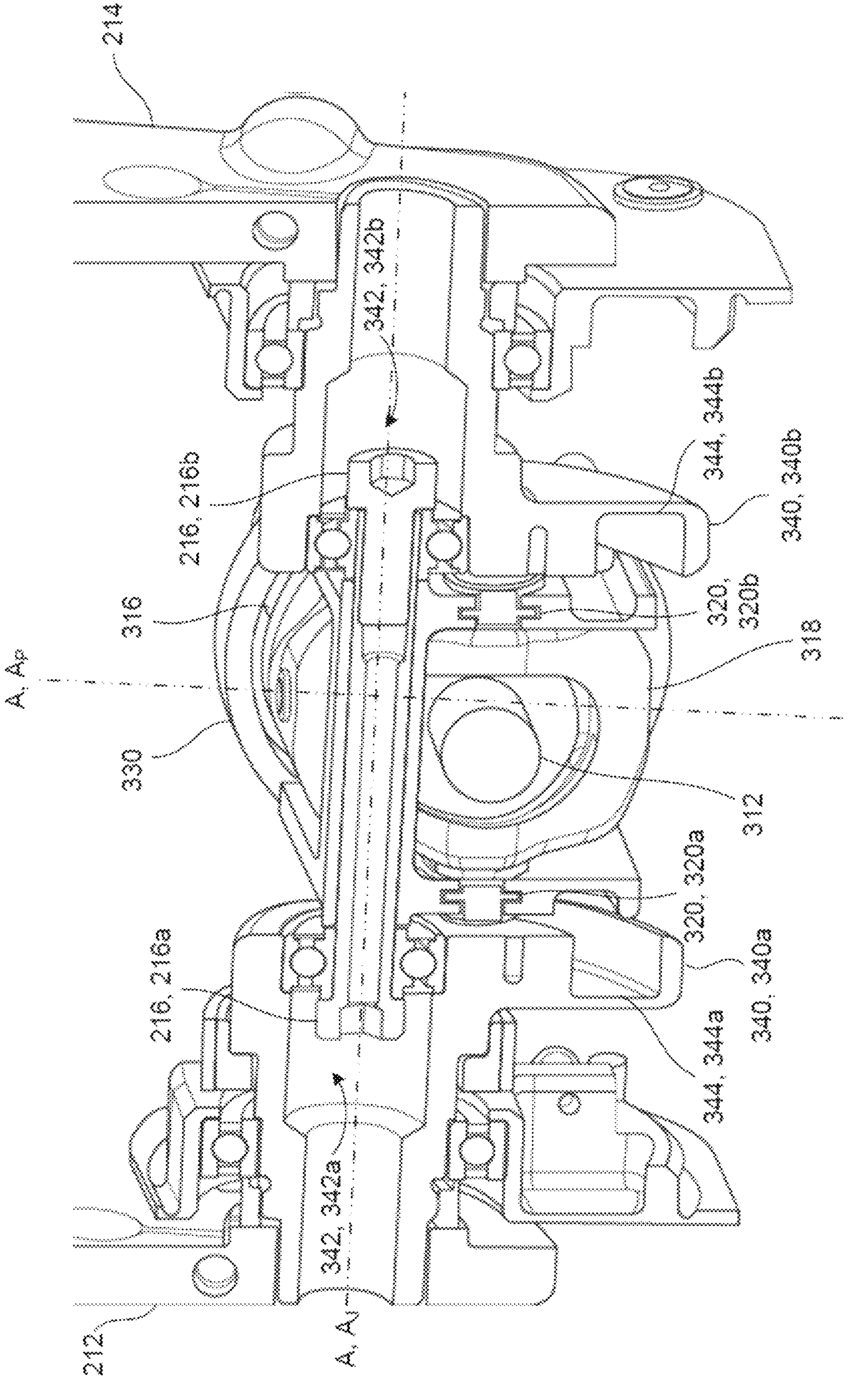
FIG. 3C is a cross-sectional view of the jaw actuator of FIG. 3A along the line 3C-3C.

To avoid a potentially damaging scenario caused by the torque imparted from the reaction forces, the gripper actuator 300 is configured to rock between a first side of the gripper actuator 300 facing the first side frame 212 and a second side of the gripper actuator 300 facing the second side frame 214 in order to prevent the linear actuator 310 of the gripper actuator 300 from experiencing the torque. Stated differently, the rocking motion of the gripper actuator 300 absorbs, minimizes, or entirely diminishes the torque that would otherwise be experienced by the linear actuator 310. To provide this safety feature, FIGS. 3A-3C depict that the gripper actuator 300 includes a linear actuator 310, a rocker shaft 320, a carrier 330, and a cam 340.

A linear actuator, such as the linear actuator 310, is an actuator that transfers rotary motion (e.g., the clockwise or counterclockwise rotation of the linear actuator 310) into generally linear motion. To accomplish this linear motion, the linear actuator 310 includes a driveshaft 312 (also referred to as a shaft 312) and a ball nut 314. The shaft 312 may be a screw shaft (e.g., also referred to as a lead screw or a spindle) that rotates about an axis $A_L$ (also referred to as an actuator axis of the linear actuator 310) of the linear actuator 310 where the axis $A_L$ extends along a length of the linear actuator 310. The screw shaft 312 includes threads on an outer diameter of the shaft 312 that form a helical structure extending along some length of the shaft 312.

As a motor associated with the linear actuator 310 generates rotary motion, the linear actuator 310 rotates either clockwise or counterclockwise. When the linear actuator 310 rotates, the ball nut 314 disposed on the linear actuator 310 extends or retracts along the shaft 312 based on the rotary motion of the linear actuator 310. To extend/retract along the shaft 312, the ball nut 314 is seated on the threaded shaft 312 to ride in a track between the treads of the shaft 312. For instance, the ball nut 314 includes its own threads that mate with the threads of the shaft 312 such that the rotary motion of the shaft 312 drives the ball nut 314 in a direction along the actuation axis $A_L$.

In some examples, the linear actuator 310 includes a ball nut housing 316. The ball nut housing 316 may be part of (i.e., integral with) the ball nut 314 or a separate component that couples with or attaches to the ball nut 314. When the ball nut 314 and the ball nut housing 316 are separate components, a bottom surface $\mathbf{316}_{S1}$ of the ball nut housing 316 may mate with a top surface $\mathbf{314}_{S1}$ of the ball nut 314 to couple the ball nut 314 to the ball nut housing 316. For instance, FIG. 3B depicts the ball nut 314 in a flanged configuration where the ball nut 314 surrounds the shaft 312 and includes a first portion with a first outer diameter and a second portion with a second outer diameter that is less than the first outer diameter (e.g., a shape resembling to concentric cylinders that are concentric about the actuation axis $A_L$). Here, the difference in the diameters generates a rim or shoulder for the flanged configuration such that the top surface $\mathbf{314}_{TS}$ of the ball nut 314 is located on this shoulder. For orientation, when referring to a top (e.g., top surface) or a bottom (e.g., a bottom surface) of various components of the gripper actuator 300, "top" refers to a moveable jaw facing direction while "bottom" refers to a fixed bottom jaw facing direction.

In order to prevent unwanted torque from transferring to the shaft 312 and the ball nut 314 of the linear actuator 310, the linear actuator 310 includes a rocker bogey 318. The rocker bogey 318 is generally disposed on the ball nut 314 such that the rocker bogey 318 may rock (i.e., move) from side to side. In other words, the rocker bogey 318 is able to move towards the first side frame 212 and/or away from the first side frame 212 towards the second side frame 214 of the top jaw 210. To generate this rocking motion, the rocker bogey 318 may be coupled to the ball nut 314 indirectly by means of the ball nut housing 316. Alternatively, when the ball nut housing 316 is part of the ball nut 314, the rocker bogey 318 is directly attached to the ball nut 314.

In some examples, the coupling between the rocker bogey 318 and the ball nut housing 316 promotes the rocking motion by either one or both of (i) a shape of an interface between the rocker bogey 318 and the ball nut housing 316 or (ii) the connection between the rocker bogey 318 and the ball nut housing 316. As one such example, the ball nut housing 316 includes a trunnion saddle 316*ts*. A trunnion refers to a cylindrical protrusion that is used as a mounting and/or pivoting point. Here, the design of the ball nut housing 316 combines the structure of a trunnion with a saddle-shaped surface where a saddle refers to an arcuate portion of a surface that includes a saddle point. Referring to FIG. 3B, a top surface of the ball nut housing 316 includes a pair of trunnion saddles $\mathbf{316}ts_{1,2}$. With a trunnion saddle $\mathbf{316}_{TS}$, the ball nut housing 316 includes a protrusion 316*p* forming a portion of the trunnion saddle $\mathbf{316}_{TS}$ that is configured to couple with the rocker bogey 318. For instance, the rocker bogey 318 includes an opening 318*o* that receives the protrusion 316*p* of the ball nut housing 316. By receiving the protrusion 316*p* of the ball nut housing 316 in the opening 318*o*, the rocker bogey 318 may pivot about an axis of the protrusion 316*p* (e.g., shown as the protrusion axis A, $A_P$ in FIGS. 3A and 3C) to rock from side to side.

In some implementations, the interface between the ball nut housing 316 and the rocker bogey 318 also promotes the ability of the rocker bogey 318 to move side to side. To promote the ability of the rocker bogey 318 to move side to side, the trunnion saddle $\mathbf{316}_{TS}$ of the ball nut housing 316 has an arcuate top surface $\mathbf{316}_{S2}$. For example, a portion of the top surface $\mathbf{316}_{S2}$ adjacent to the protrusion 316*p* has a parabolic-shaped curvature. In this example, the rocker bogey 318 also includes a curved surface 318*si* on a bottom side of the rocker bogey 318 facing the ball nut housing 316. The curved surface $\mathbf{318}_{S1}$ is generally a complimentary curve (e.g., a complimentary parabolic curve) with respect to the top surface $\mathbf{316}_{S2}$ of the ball nut housing 316 to provide an interface where the ball nut housing 316 and the rocker bogey 318 mesh together (e.g., shown as the interface between the top surface $\mathbf{316}_{S2}$ of the ball nut housing 316 and the bottom surface $\mathbf{318}_{S1}$ of the rocker bogey 318).

In some examples, the interface where the ball nut housing 316 and the rocker bogey 318 mesh together promotes the ability of the rocker bogey 318 to move side to side. For instance, at the interface, the arcuate top surface $\mathbf{316}_{S2}$ of the ball nut housing 316 is offset from the curved surface $\mathbf{318}_{S1}$ on the bottom side of the rocker bogey 318 facing the ball nut housing 316. This gap or offset may be proportional to the distance that the rocket bogey 318 is able to pivot about the protrusion 316*p*. For instance, when the rocker bogey 318 moves to one side, the rocker bogey 318 closes or reduces the gap on that side of the protrusion 316*p*. When the rocker bogey 318 is in a neutral position or a position where the rocket bogey 318 is centered within the trunnion saddle $\mathbf{316}_{TS}$ of the ball nut housing 316, the gap occurs along the entire interface between the rocker bogey 318 and the ball nut housing 316. Here, when the rocker bogey 318 pivots to a biased position, at least a portion of the gap is reduced at the interface between the rocker bogey 318 and the ball nut housing 316. In some examples, the rocker bogey 318 is able to pivot to a biased position where a portion of the rocker bogey 318 contacts the ball nut housing 316 (e.g., at the acuate top surface $\mathbf{316}_{S2}$). This interference with the ball nut housing 316 may allow the ball nut housing 316 to serve as a movement limit or stop for the pivoting motion of the rocker bogey 318. In other words, the arcuate top surface $\mathbf{316}_{S2}$ or saddle of the ball nut housing 316 is able to both promote the rocking motion of the rocker bogey 318 (e.g. by the gap/offset at the interface) while also acting as some form of constraint for the rocker bogey 318 (e.g., a movement limit).

As shown in FIGS. 3A-3C, the rocker bogey 318 also includes a pair of second openings 31802 that receive the rocker shaft 320 (e.g., shown as a first rocker shaft 320, 320*a* and a second rocker shaft 320*b*). The rocker shaft 320 may be inserted into the pair of second openings $318_{O2}$ such that the rocker shaft 320 couples to the rocker bogey 318 by aligning a center of the second opening $318_{O2}$ with a longitudinal axis along the rocker shaft 320 (e.g., shown as a shaft axis A, $A_S$ in FIG. 3A) that is perpendicular to the protrusion axis $A_P$. While the rocker shaft 320 is seated in the second opening $318_{O2}$, each end of the rocker shaft 320 may translate in a direction along the actuation axis $A_L$. When the rocker shaft 320 moves along the actuation axis $A_L$, the rocker shaft 320 is positioned to engage with the cam 340 to translate the linear motion along the actuation axis $A_L$ to rotary motion.

In some configurations, the linear actuator 310 is at least partially enclosed in a carrier 330. The carrier 330 may refer to a frame attached to the ball nut 314 or ball nut housing 316 (e.g., by fasteners) that surrounds, or is offset from, the shaft 312 of the linear actuator 310. The carrier 330 generally functions to constrain the side to side movement of the rocker bogey 318 (i.e., serves as an anti-rotation mechanism). Since the rocker bogey 318 may rotate about the protrusion axis $A_P$ by pivoting on the protrusion 316*p*, the carrier 330 includes slots or rails that at least partially constrain the rocker bogey 318. For example, the rocker shaft 320, which is coupled to the rocker bogey 318 rides in a slot 332 of the carrier 330 as the rocker bogey 318 and the carrier 330 move along the shaft 312 of the linear actuator 310 together. FIG. 3B illustrates that a first slot 332, 332*a* constrains the first rocker shaft 320*a* on a side of the gripper actuator 300 that faces the first side frame 212 of the top jaw 210 and a second slot 332, 332*b* constrains the second rocker shaft 320*b* on an opposite side of the gripper actuator 300 that faces the second side frame 214 of the top jaw 210. In some configurations, the portion of the rocker shaft 320 that engages with the slot 332 or rails of the carrier 330 includes one or more bearings. By having bearings located where the rocker shaft 320 may engage with the carrier 330, the bearings enable minimal or low friction to ensure that motion of the rocker bogey 318 does not result in a detrimental amount of drive energy being lost in translation from the linear actuator 310 to the moveable jaw 210 (e.g., via the cam 340).

The cam 340 includes a jaw engaging opening 342, an involute slot 344, and a hard stop slot 346. As shown in FIGS. 3A and 3C, the rocker shaft 320 engages with the cam 340 by protruding into and riding along the involute slot 342. Stated differently, the cam 340 is in a position that align the involute slot 342 with the rocker shaft 320 so that walls of the involute slot 342 surround the rocker shaft 320. As the linear actuator 310 actuates, the rocker shaft 320 travels towards either end of the involute slot 342. When the rocker shaft 320 reaches either end of the involute slot 342, the linear actuation 310 continues to move and causes the rocker shaft 320 to impart a force on an end of the involute slot 342 that drives the cam 340 to rotate the moveable jaw 210 through its arc of motion. For instance, when the linear actuator 310 moves towards the top jaw 210, the cam 340 rotates the top jaw 210 downwards towards the bottom jaw 220 to close the mouth of the gripper 200. On the other hand, when the linear actuator 310 moves away from the top jaw 210 (e.g., towards the bottom jaw 220), the cam 340 rotates the top jaw 210 away from the bottom jaw 220 to open the mouth of the gripper 200.

In order to enable the linear actuator 310 to drive the moveable jaw 210 open or closed, the jaw engaging opening 342 of the cam 340 receives the top jaw pin 216. By the jaw engaging opening 342 of the cam 340 receiving the top jaw pin 216, the moveable jaw 210 is affixed to the cam 340. With this fixed point, the moveable jaw 210 has a pivot point to pivot about a jaw pivot axis A, $A_J$. For example, FIG. 3C illustrates a first jaw pin 216*a* coupling to a first cam 340, 340*a* in a first opening 342, 342*a* on a side of the gripper actuator 300 facing the first side frame 212 and a second jaw pin 216*b* coupling to a second cam 340, 340*b* in a second opening 342, 342*b* on an opposite side of the gripper actuator 300 facing the second side frame 214.

In some configurations, the cam 340 includes the hardstop slot 346 that is configured to constrain an amount of the range of motion (ROM) of the top jaw 210. To constrain of the top jaw 210, the carrier 330 includes an end stop 334. For instance, FIG. 3B illustrates the carrier 330 with a pair of end stops 334 at an end of each slot 332 that is opposite the rocker bogey 318. When the cam 340 connects to the top jaw 210, each cam 340 is positioned such that the end stop 334 is seated within the hardstop slot 346 of the respective cam 340 (e.g., walls of the hardstop slot 346 surround the end stop 334). As the rocker shaft 320 drives the cam 340, the end stop 334 travels in the hardstop slot 346. When the end stop 334 reaches either end of the hardstop slot 346, the interference of the end stop 334 and an end of the hardstop slot 346 prevents further rotation of the cam 340.

Figure 4:
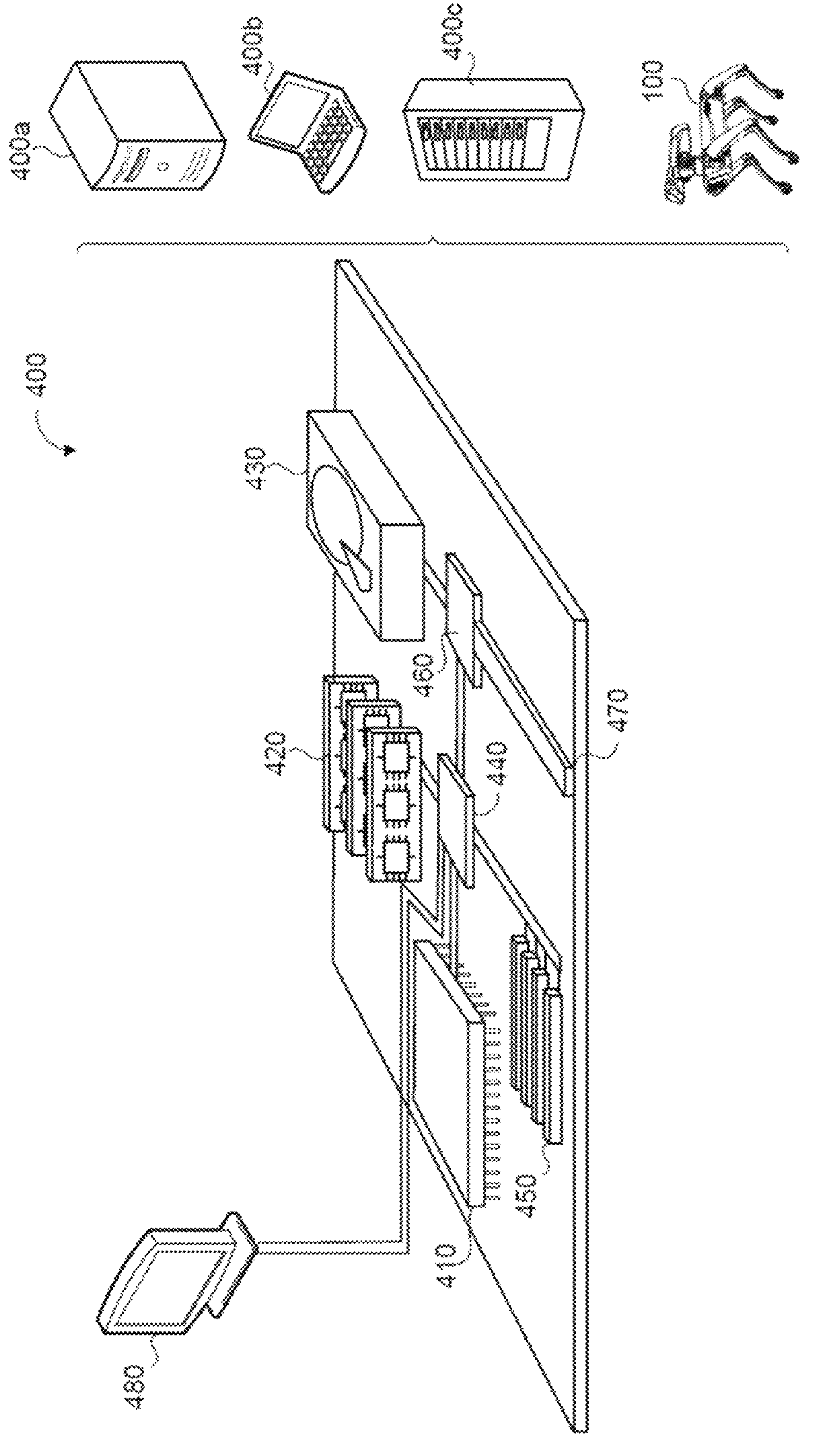
FIG. 4 is a schematic view of an example computing device that may be used to implement the systems and methods described herein.

FIG. 4 is schematic view of an example computing device 400 that may be used to implement at least a portion of the systems (e.g., the robot 100, the robot 500, the sensor system 130, the control system 170, the linear actuator 310, and/or the gripper mechanism 300) and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400*a* or multiple times in a group of such servers 400*a*, as a laptop computer 400*b*, as part of a rack server system 500*c*, or as part of the robot 100.

Figure 5A:
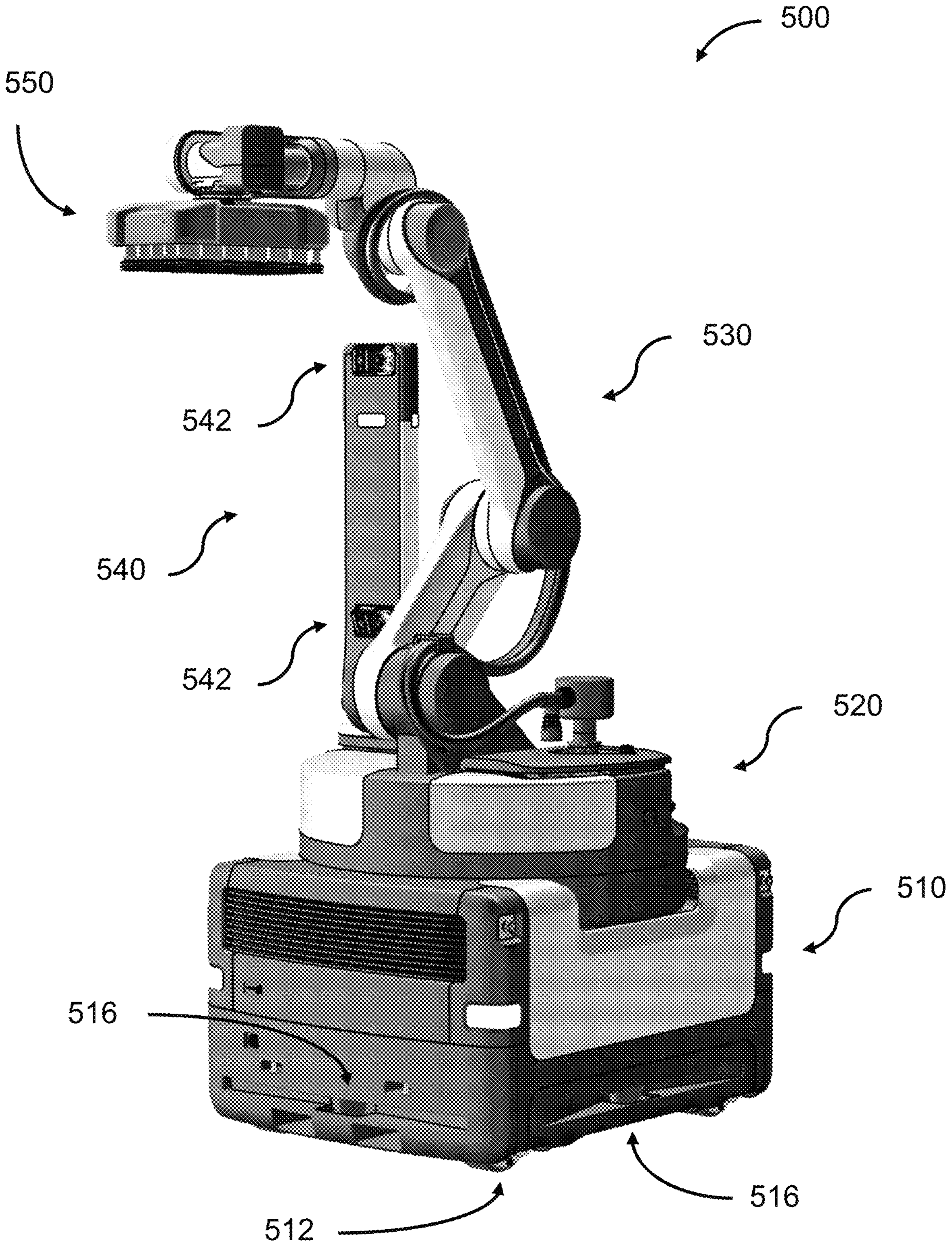
FIG. 5A is a perspective view of another example robot with a gripper mechanism.
Figure 5B:
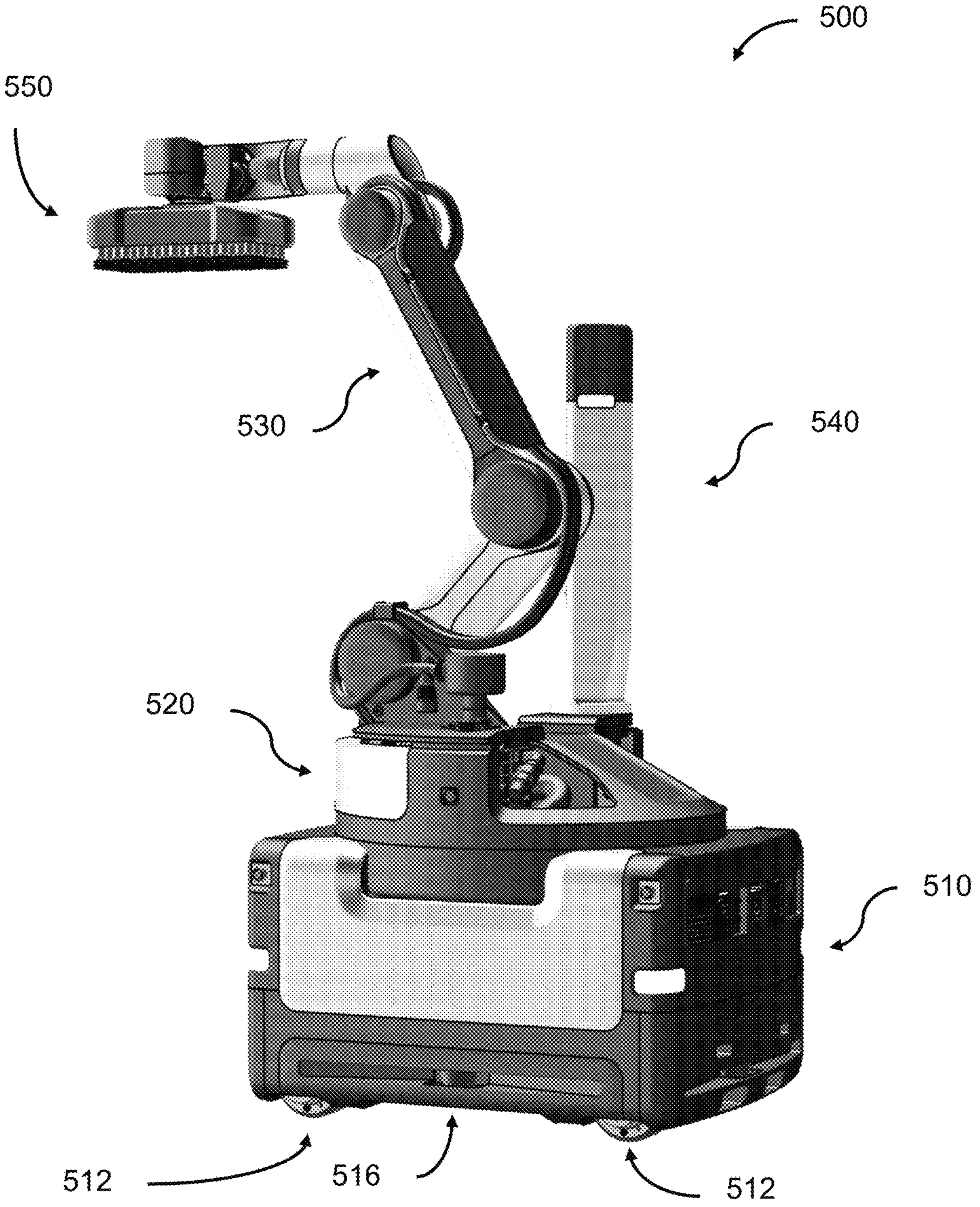
FIG. 5B is another perspective view of the robot of FIG. 5A.

FIGS. 5A and 5B are perspective views of an embodiment of a robot 500. The robot 500 includes a mobile base 510 and a robotic arm 530. The mobile base 510 includes an omnidirectional drive system that enables the mobile base to translate in any direction within a horizontal plane as well as rotate about a vertical axis perpendicular to the plane. Each wheel 512 of the mobile base 510 is independently steerable and independently drivable. The mobile base 510 additionally includes a number of distance sensors 516 that assist the robot 500 in safely moving about its environment. The robotic arm 530 is a 6 degree of freedom (6-DOF) robotic arm including three pitch joints and a 3-DOF wrist. An end effector 550 is disposed at the distal end of the robotic arm 530. The end effector 550 may include a gripper mechanism (e.g., a suction-based gripper mechanism) that enables robot 500 to interact with (e.g., pick up) objects in the environment of the robot. The robotic arm 530 is operatively coupled to the mobile base 510 via a turntable 520, which is configured to rotate relative to the mobile base 510. In addition to the robotic arm 530, a perception mast 540 is also coupled to the turntable 520, such that rotation of the turntable 520 relative to the mobile base 510 rotates both the robotic arm 530 and the perception mast 540. The robotic arm 530 is kinematically constrained to avoid collision with the perception mast 540. The perception mast 540 is additionally configured to rotate relative to the turntable 520, and includes a number of perception modules 542 configured to gather information about one or more objects in the robot's environment. One or more of the perception modules 542 may include one or more sensors (e.g., cameras) for acquiring sensor data reflecting aspects of the robot's environment. The integrated structure and system-level design of the robot 500 enable fast and efficient operation in a number of different applications, some of which are provided below as examples.

Figure 5C:
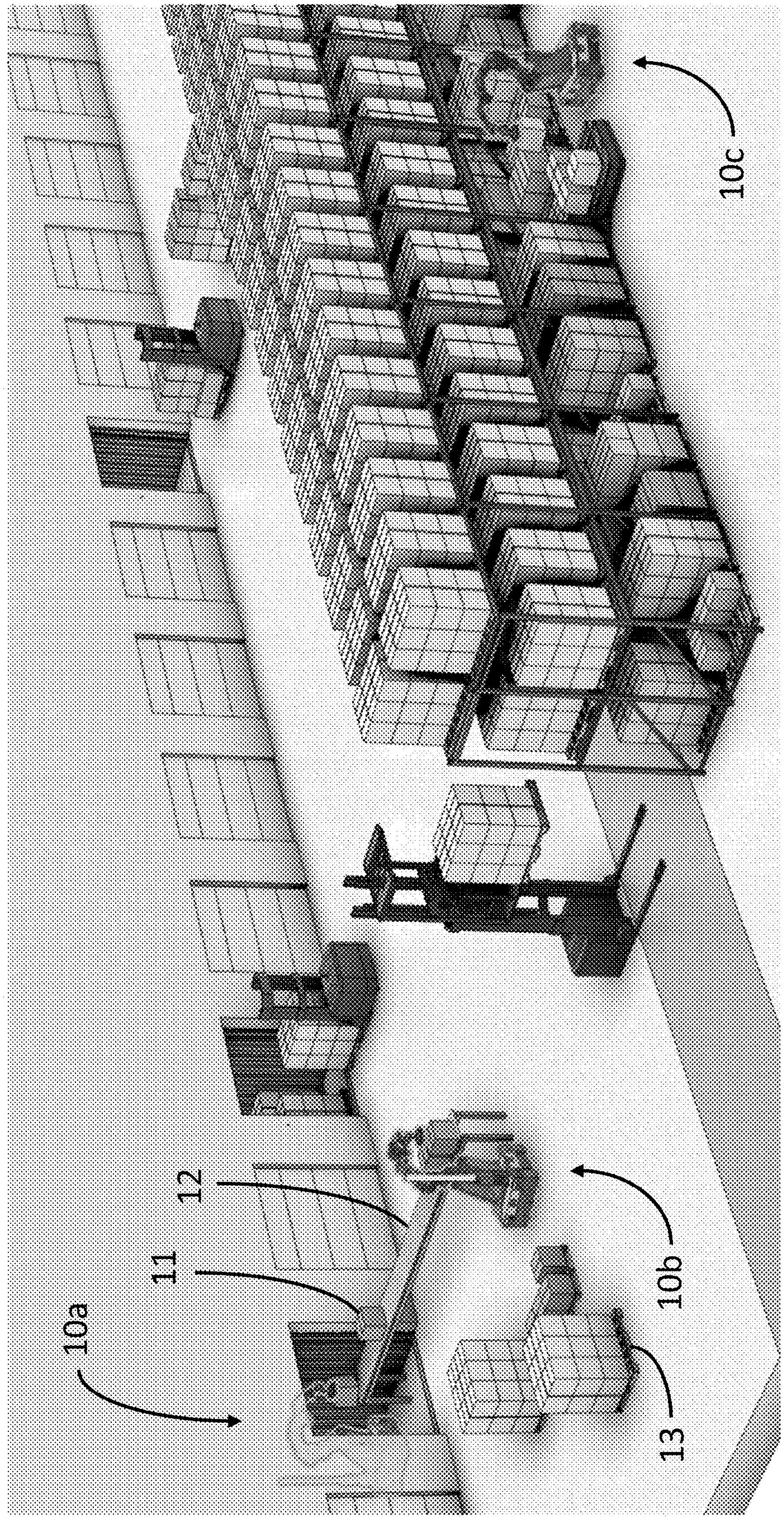
FIG. 5C depicts robots performing tasks in a warehouse environment.

FIG. 5C depicts robots 10*a*, 10*b*, and 10*c* performing different tasks within a warehouse environment. A first robot 10*a* is inside a truck (or a container), moving boxes 11 from a stack within the truck onto a conveyor belt 12 (this particular task will be discussed in greater detail below in reference to FIG. 5D). At the opposite end of the conveyor belt 12, a second robot 10*b* organizes the boxes 11 onto a pallet 13. In a separate area of the warehouse, a third robot 10*c* picks boxes from shelving to build an order on a pallet (this particular task will be discussed in greater detail below in reference to FIG. 5E). It should be appreciated that the robots 10*a*, 10*b*, and 10*c* are different instances of the same robot (or of highly similar robots). Accordingly, the robots described herein may be understood as specialized multi-purpose robots, in that they are designed to perform specific tasks accurately and efficiently, but are not limited to only one or a small number of specific tasks.

Figure 5D:
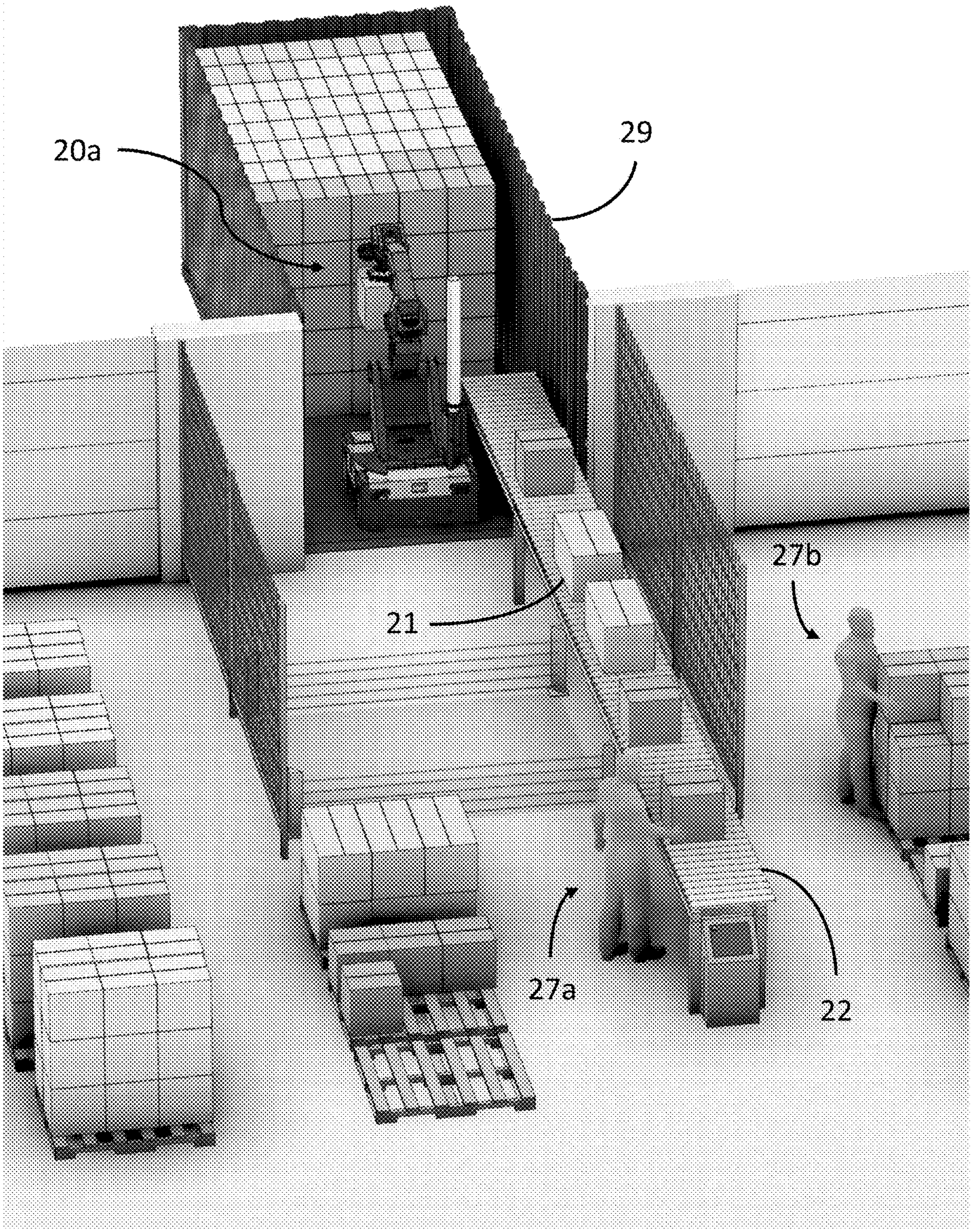
FIG. 5D depicts a robot unloading boxes from a truck.

FIG. 5D depicts a robot 20*a* unloading boxes 21 from a truck 29 and placing them on a conveyor belt 22. In this box picking application (as well as in other box picking applications), the robot 20*a* will repetitiously pick a box, rotate, place the box, and rotate back to pick the next box. Although robot 20*a* of FIG. 5D is a different embodiment from robot 500 of FIGS. 5A and 5B, referring to the components of robot 500 identified in FIGS. 5A and 5B will ease explanation of the operation of the robot 20*a* in FIG. 2B. During operation, the perception mast of robot 20*a* (analogous to the perception mast 540 of robot 500 of FIGS. 5A and 5B) may be configured to rotate independent of rotation of the turntable (analogous to the turntable 520) on which it is mounted to enable the perception modules (akin to perception modules 542) mounted on the perception mast to capture images of the environment that enable the robot 20*a* to plan its next movement while simultaneously executing a current movement. For example, while the robot 20*a* is picking a first box from the stack of boxes in the truck 29, the perception modules on the perception mast may point at and gather information about the location where the first box is to be placed (e.g., the conveyor belt 22). Then, after the turntable rotates and while the robot 20*a* is placing the first box on the conveyor belt, the perception mast may rotate (relative to the turntable) such that the perception modules on the perception mast point at the stack of boxes and gather information about the stack of boxes, which is used to determine the second box to be picked. As the turntable rotates back to allow the robot to pick the second box, the perception mast may gather updated information about the area surrounding the conveyor belt. In this way, the robot 20*a* may parallelize tasks which may otherwise have been performed sequentially, thus enabling faster and more efficient operation.

Also of note in FIG. 5D is that the robot 20*a* is working alongside humans (e.g., workers 27*a* and 27*b*). Given that the robot 20*a* is configured to perform many tasks that have traditionally been performed by humans, the robot 20*a* is designed to have a small footprint, both to enable access to areas designed to be accessed by humans, and to minimize the size of a safety zone around the robot into which humans are prevented from entering.

Figure 5E:
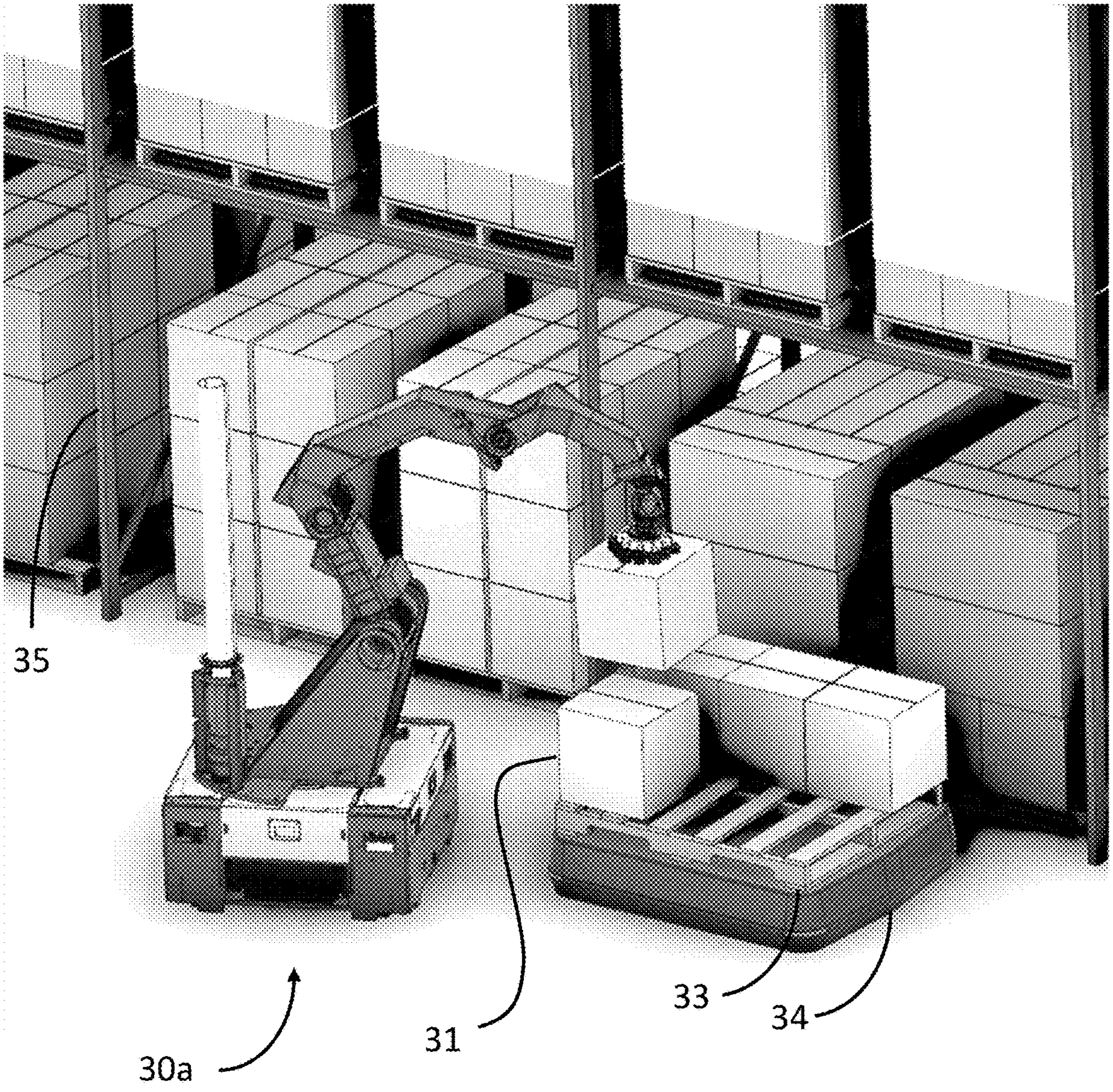
FIG. 5E depicts a robot building a pallet in a warehouse aisle.

FIG. 5E depicts a robot 30*a* performing an order building task, in which the robot 30*a* places boxes 31 onto a pallet 33. In FIG. 5E, the pallet 33 is disposed on top of an autonomous mobile robot (AMR) 34, but it should be appreciated that the capabilities of the robot 30*a* described in this example apply to building pallets not associated with an AMR. In this task, the robot 30*a* picks boxes 31 disposed above, below, or within shelving 35 of the warehouse and places the boxes on the pallet 33. Certain box positions and orientations relative to the shelving may suggest different box picking strategies. For example, a box located on a low shelf may simply be picked by the robot by grasping a top surface of the box with the end effector of the robotic arm (thereby executing a "top pick"). However, if the box to be picked is on top of a stack of boxes, and there is limited clearance between the top of the box and the bottom of a horizontal divider of the shelving, the robot may opt to pick the box by grasping a side surface (thereby executing a "face pick").

To pick some boxes within a constrained environment, the robot may need to carefully adjust the orientation of its arm to avoid contacting other boxes or the surrounding shelving. For example, in a typical "keyhole problem", the robot may only be able to access a target box by navigating its arm through a small space or confined area (akin to a keyhole) defined by other boxes or the surrounding shelving. In such scenarios, coordination between the mobile base and the arm of the robot may be beneficial. For instance, being able to translate the base in any direction allows the robot to position itself as close as possible to the shelving, effectively extending the length of its arm (compared to conventional robots without omnidirectional drive which may be unable to navigate arbitrarily close to the shelving). Additionally, being able to translate the base backwards allows the robot to withdraw its arm from the shelving after picking the box without having to adjust joint angles (or minimizing the degree to which joint angles are adjusted), thereby enabling a simple solution to many keyhole problems.

Of course, it should be appreciated that the tasks depicted in FIGS. 5C-5E are but a few examples of applications in which an integrated mobile manipulator robot may be used, and the present disclosure is not limited to robots configured to perform only these specific tasks. For example, the robots described herein may be suited to perform tasks including, but not limited to, removing objects from a truck or container, placing objects on a conveyor belt, removing objects from a conveyor belt, organizing objects into a stack, organizing objects on a pallet, placing objects on a shelf, organizing objects on a shelf, removing objects from a shelf, picking objects from the top (e.g., performing a "top pick"), picking objects from a side (e.g., performing a "face pick"), coordinating with other mobile manipulator robots, coordinating with other warehouse robots (e.g., coordinating with AMRs), coordinating with humans, and many other tasks.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 6A:
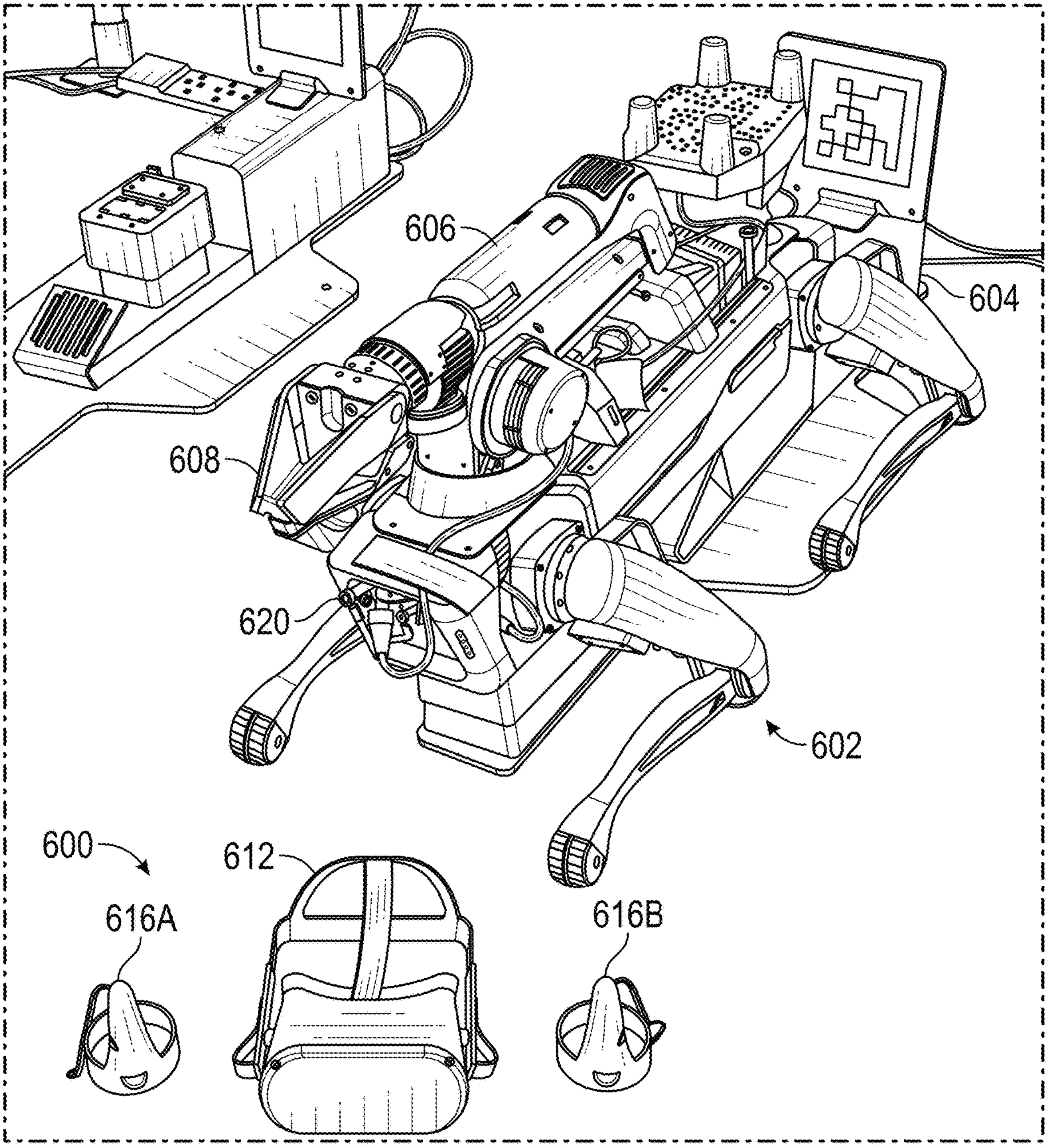
FIG. 6A is a schematic view of an example set of XR equipment next to a robot with which it is configured to communicate, according to an illustrative embodiment of the invention.

FIG. 6A is a schematic view of an example set of XR equipment 600 next to a robot 602 (e.g., an omnidirectional and/or quadruped robot, as shown and described above, which here is shown docked on docking station 604) with which it is configured to communicate (e.g., to control), according to an illustrative embodiment of the invention. The robot 602 has a manipulator (e.g., an arm 606 including a gripper mechanism 608, as shown and described above), according to an illustrative embodiment of the invention. The XR equipment 600 can include, for example, a HMD 612 and/or one or more remote controllers 616 (e.g., remote controllers 616A, 616B as shown). The HMD 612 and/or each remote controller 616 can be in electronic (e.g., wireless) communication with the robot 602 (e.g., directly or via one or more computing devices). In some embodiments, the remote controller(s) 616 include two or more independent remote controllers, such as a left hand controller and a right hand controller (e.g., 616A and 616B as shown), which may be capable of independently and/or cooperatively communicating with (e.g., providing different commands to) the robot 602. In some embodiments, the left hand controller and the right hand controller may be configured to simultaneously communicate with the robot 602 to instruct the robot to perform an action. The XR equipment 600 can also include one or more cameras (e.g., stereo camera 620), which can be mounted to the robot 602 (e.g., at a location near the front of the robot 602). The robot 602 can also include built-in cameras, such as camera (and/or others not explicitly numbered on the drawing), depth sensors, and/or other sensors configured to capture other data associated with the robot 602 and/or the robot's environment.

In some embodiments, the HMD 612 can provide an operator with an immersive and/or wide field of view display. In some embodiments, the HMD 612 can provide a separate high resolution color image to each eye of an operator. In some embodiments, the image for each eye can be slightly different (e.g., to account for the slightly different vantage point of each eye in 3D space), such that the operator is provided a 3D viewing experience. In some embodiments, the HMD 612 includes embedded mobile hardware and/or software. In some embodiments, the HMD 612 and/or each remote controller 616 includes motion tracking capabilities (e.g., using a simultaneous localization and mapping (SLAM) approach), which can measure position and/or orientation (e.g., six degree-of-freedom tracking, including three position coordinates and three orientation coordinates as functions of time). In some embodiments, the motion tracking capabilities are achieved using a number of built-in cameras. In some embodiments, each remote controller 616 can include one or more touch controls (e.g., sticks, buttons and/or triggers) to receive operator input. In some embodiments, the HMD 612 can enable at least one of virtual panning and virtual tilting. In some embodiments, each remote controller 616 includes a haptic feedback function (e.g., using a rumble motor). In some embodiments, the HMD 612 includes an audio output function (e.g., using integrated speakers with spatial audio). In some embodiments, the HMD 612 includes a microphone. In some embodiments, the HMD enables voice commands and/or two-way communication with any individual(s) near the robot 602 during operation.

Figure 6B:
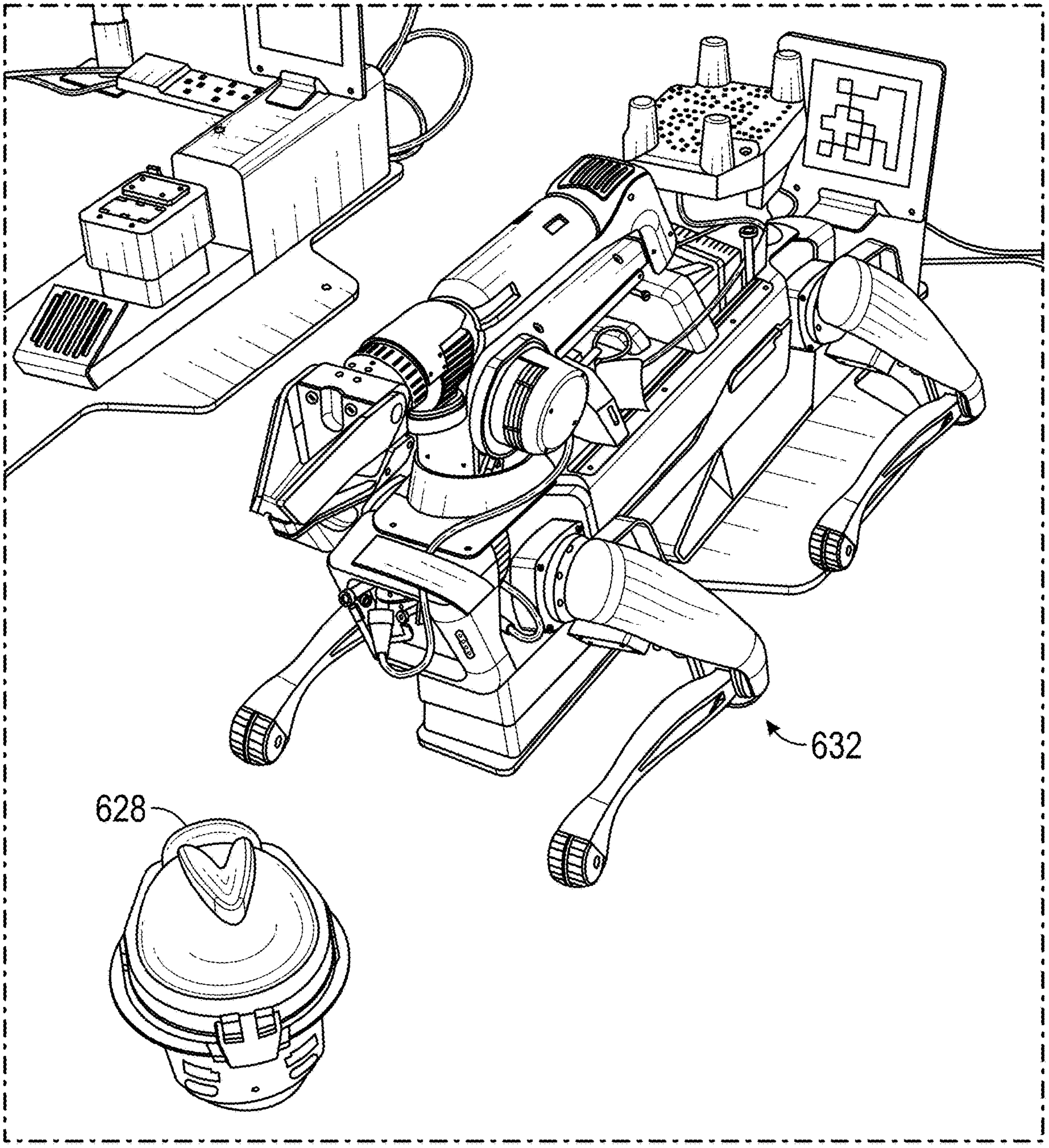
FIG. 6B is a schematic view of another example set of XR equipment next to a robot with which it is configured to communicate, according to an illustrative embodiment of the invention.

In some embodiments, the HMD 612 and remote controller(s) 616 can include Oculus™ Quest™ hardware, available from Meta™ Platforms, Inc., as shown in FIG. 6A. Although FIG. 6A shows one exemplary setup, others are possible. For example, FIG. 6B is a schematic view of another example set of XR equipment 628 next to a robot 632 (e.g., similar to those shown in FIG. 6A above) with which it is configured to communicate (e.g., to control), according to an illustrative embodiment of the invention. In FIG. 6B, the equipment 628 includes a Microsoft™ Hololens™ (e.g., a Hololens 2) setup. In some embodiments, some of the information tracked by XR equipment 628 can be similar to that tracked by XR equipment 600 shown in FIG. 6A, with certain notable differences in approach. For example, in some embodiments, such as the one shown in FIG. 6B, an inertial measurement unit (IMU) can receive operator input via an accelerometer, gyroscope, and/or magnetometer). In some embodiments, one or more sensors and/or depth cameras can also receive input. In some embodiments, the XR equipment 628 includes eye tracking and/or natural language processing capabilities. In some embodiments, the XR equipment 628 can produce a depth map of the surrounding environment. In some embodiments, a depth map can enable mixed reality interactions (e.g., resizing and/or placing a hologram of the robot in the viewing area) and/or pre-recording maps of the environment (e.g., for use by the robot to seed auto-walk missions). In some embodiments, the XR equipment 628 includes hand tracking capabilities. In some embodiments, the XR equipment 628 enables a "mixed reality" environment (e.g., a "see-through" display that enables the operator to operate the robot using gestures and/or speech) while moving about the environment. In some embodiments, the XR equipment 628 further enables a "virtual reality" (VR) environment that provides a more (e.g., fully) immersive experience to the operator. In some embodiments, the XR equipment 628 is operable to enable the operator to switch between a mixed reality mode and a virtual reality mode.

Figure 6C:
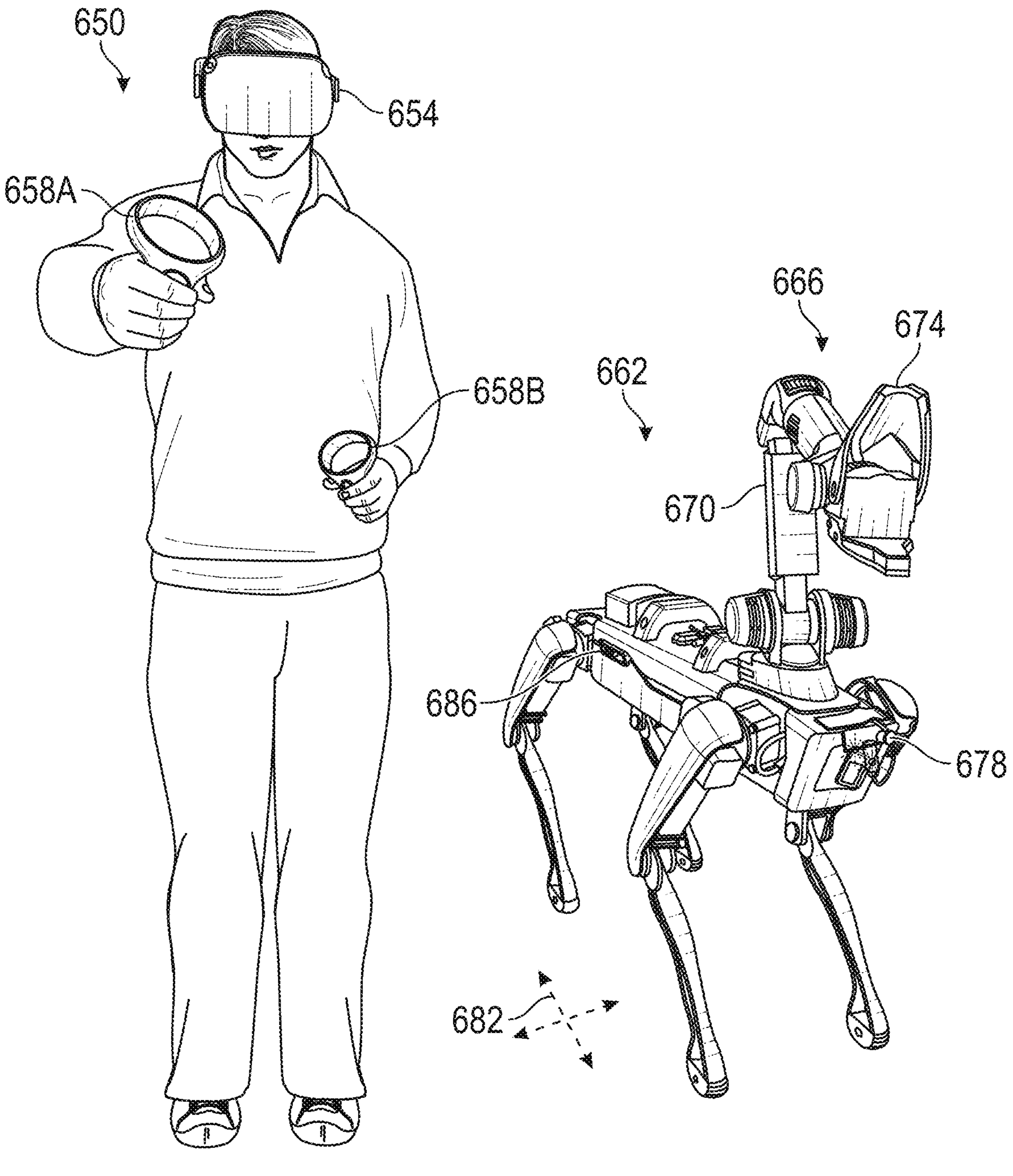
FIG. 6C is a perspective view of an example operator wearing an XR HMD and using remote equipment to control a robot having a manipulator, according to an illustrative embodiment of the invention.

FIG. 6C is a perspective view of an example operator 650 wearing an XR HMD 654 and using remote controllers 658 (e.g., remote controllers 658A, 658B) to control a robot 662 having a manipulator 666 (e.g., an arm 670 having a gripper mechanism 674, examples of which are described above in FIGS. 1A-3C and FIGS. 5A-5B), according to an illustrative embodiment of the invention. During operation, a computing device (e.g., on board the robot 662 or remote from the robot 662) can receive from a sensor 678 (e.g., a camera on board the robot 662 or remote from the robot 662) sensor data (e.g., video input) reflecting aspects of the robot's environment. The camera 678 can be configured to capture images that span a wide field of view, e.g., at least 150 degrees with respect to a ground plane 682 of the robot 662. In some embodiments, camera 678 has a field of view spanning 160, 170, 180, 200, 220, 250, 280, 320, or 360 degrees. The computing device can also receive input from other cameras (e.g., the side camera 686, which can be similar to the side camera on board the robot shown and described above in FIG. 6A), depth sensors (e.g., SONAR or acoustic imaging), infrared cameras, and/or other sensors on board the robot and/or built into the robot. In some embodiments, a payload attached to the robot can provide additional information streams. The computing device can provide video output to the HMD 654 (e.g., while being worn by the operator 650). The video output can reflect aspects of the environment of the robot. In some embodiments, the video output also includes enhancements or other alterations to the environment of the robot that reflect additional information, such as depth information (e.g., as shown and described below in connection with FIGS. 7A-7B) and/or robot state information. In some embodiments, the video output includes other information, such as WiFi signal strength, battery life (e.g., of the XR equipment and/or the robot), and/or information streams provided by one or more external payloads attached to the robot. In some embodiments, the camera 678 includes a stereo camera or other depth sensing component or camera, a time-of-flight sensor, or a LIDAR component.

The video output provided to the HMD 654 can enable the operator 650 to understand aspects of the environment around the operator in rich detail (e.g., full-color, high resolution, wide field-of-view video) as well as how the robot 662 is situated within that environment. Using this information, the operator 650 can devise a plan for how to control the manipulator 666 to achieve a desired control operation (e.g., manipulation task) of the robot. In some embodiments, the desired control operation may be an operation to move one or more components of the robot. In some embodiments, the desired control operation may be an operation of the robot other than movement (e.g., activating/deactivating at least a portion of one or more systems or components of the robot). In some embodiments, the desired control operation may be an operation that combines movement and non-movement based capabilities of the robot. For embodiments in which the desired control operation includes, at least in part, movement of one or more components of the robot, the operator 650 may be enabled to move (e.g., "puppet") one or more components of the robot 662 using, for example, the remote controllers 658A, 658B. In some embodiments, one or more of the remote controllers 658A, 658B supports a "click and drag" feature, which enables the operator 650 to effect movements only when s/he desires movement to be mimicked by the robot 662. Such a feature can also help enable the operator 650 to effect movements outside of his or her natural range (e.g., by taking multiple passes along a similar trajectory to effect a long-range movement). Such a feature can also enable motions by the operator 650 to be tracked by the robot 662 on a 1:1 basis, or on another fixed or variable ratio length scale (e.g., 1:2, 1:4, etc.).

The computing device can receive movement information reflecting movement by the operator 650 (e.g., a change in at least one of position or orientation, such as in Cartesian coordinate space). Based on the movement information, the computing device can then control the robot 662 to move (e.g., it can control the manipulator 666 to move, the robot 662 to move relative to its environment, and/or the robot 662 to move relative to its absolute position, e.g., based on a map of the environment). In some embodiments, the sensor data is received in real-time (e.g., including only a small delay corresponding to processing and/or buffering time, which may be on the order of tens or hundreds of milliseconds, or in some cases seconds). In some embodiments, the video output is provided to the operator 650 in real-time. In some embodiments, the operator 650 provides, and/or the computing device receives, movement information in real-time, such that the robot 662 may be commanded and/or controlled to move in real-time based on the movement information. In some embodiments, a structured delay is introduced into one or more of these steps, e.g., to introduce a planning period so that desired motions may be planned and/or tracked at one time and executed by the robot 662 at a later time. For example, the operator 650 can use the XR equipment 654, 658 to record motion plans and/or maps for the robot 662, which can be later loaded onto the robot 662. In this way, the XR equipment's 654, 658 localization and/or mapping capabilities can be used to help create missions without needing the robot 662 near the operator 650 during the mission. In some embodiments, data captured in this way can seed the robot's 662 mapping and/or planning algorithms.

In some embodiments, the robot 662 can be commanded to perform a gross motor task, which may correspond to a particular component of motion or input to a motion also determined in part by other inputs. For example, the robot 662 may also determine (e.g., automatically and/or simultaneously) supporting movements (e.g., to keep the robot 662 upright while the manipulator 666 navigates to a particular location specified by the operator 650). In some embodiments, the supporting movements may be based on sensor data from the environment. Other examples are also possible. In some embodiments, controlling the robot 662 to move can include generating a manipulation plan based on the movement information and/or generating a locomotion plan based on the manipulation plan. In some embodiments, the remote controllers 658A, 658B can be in communication with at least two robots, which may be instructed to move in a coordinated and/or complementary fashion. In some embodiments, the robot 662 can be controlled (e.g., pursuant to a command by the operator) to move to a desired pose in the environment, e.g., relative to a fixed anchor, such as a real or a virtual anchor location. In some embodiments, controlling the robot 662 to move includes determining robot steering instructions, e.g., based on a location of the operator relative to a distance from an anchor location. In some embodiments, the robot steering instructions include one or more target velocities or other relevant metrics. In some embodiments, the robot steering instructions may be generated based on a manipulation of a virtual slave (e.g., a holographic joystick presented in HMD 654) of the robot. For instance, the operator 650 may interact with the virtual slave to specify one or more motion parameters including, but not limited to, velocity (direction and speed) and angular velocity (turning/pitching). As an example, the operator may drag the virtual slave away from a central point, and the distance that the virtual slave is dragged may be used to calculate a velocity (direction and speed). As another example, the operator may rotate the virtual slave to specify an angular velocity. The one or more motion parameters may be used to generate the robot steering instructions.

The kinematic details of controlling the robot 662 to move may vary from implementation to implementation, and may include some of the following. In some embodiments, controlling the robot 662 to move includes mapping a workspace of the operator 650 to a workspace of the manipulator 666 (e.g., as shown and described below in connection with FIGS. 8A-8B). In some embodiments, controlling the robot 662 to move includes generating a movement plan in the workspace of the manipulator 666 based on a task-level result to be achieved. The movement plan can reflect an aspect of motion that is different from that reflected in the movement information. In some embodiments, controlling the robot 662 to move includes utilizing a force control mode if an object is detected to be in contact with the manipulator 666. In some embodiments, controlling the robot 662 to move includes utilizing a low-force mode or no-force mode if no object is detected to be in contact with the manipulator 666. In some embodiments, controlling the robot 662 to move includes controlling the robot 662 to grasp an object by specifying a location of the object, the robot 662 determining a suitable combination of locomotion by the robot 662 and movement by the manipulator 666 to grasp the object.

In some embodiments, controlling the robot 662 to move includes generating a "snap-to" behavior for the manipulator. A snap-to behavior can be utilized when the robot 662 understands that it has encountered a "manipulable" object in its library of behaviors. In one illustrative example, the robot 662 encounters an object based on input by the operator 650 (e.g., the operator 650 moves such that the manipulator 666 is commanded to move onto a door handle). The operator 650 can then hit a button corresponding to a "grasp" command (e.g., provided to the operator as a selectable option in an XR environment using remote controller 658A and/or 658B), which can command the manipulator 666 to grasp the door handle. In this way, the robot 662 can "snap" into a behavior mode that allows the operator 650 to make a gesture that, for example, slides along a parameterized door handle turning controller. Such a feature can allow the operator 650 not to need precise visual and/or haptic feedback, but can specify general and/or higher-level tasks in an approximate way and let the robot 662 handle the specific and/or localized kinematic details of motion. In some embodiments, the operator 650 can define an end state (e.g., having a given duration), and the robot 662 can interpolate and/or create its own trajectory. In some embodiments, this process can be decoupled from refreshing data into the visualization, e.g., the required computation can happen on the robot 662. In some embodiments, the operator 650 can use a voice command (e.g., collected from one or more microphones in or in communication with the XR device) to make the robot 662 perform certain tasks and/or move to certain locations.

In some embodiments, an XR device may be used to select one or more components of the robot to move. For instance, operator 650 of the XR device may use remote controller 658A and/or 658B to select manipulator 666 (or a portion of manipulator 666) of robot 662 as the component to move, and subsequently use remote controller 658A and/or 658B to move the manipulator 666 to perform a desired movement according to movement information. In some embodiments, the XR device may be used to select one or more components of the robot to constrain movement. For instance, operator 650 of the XR device may use remote controller 658A and/or 658B to virtually constrain one component of robot 662 and move any other part of the robot's kinematic chain (e.g., apply a constraint to three of four legs of robot 662 and then drag the fourth leg around, apply a constraint to the end of the manipulator 666 and then move a joint of the manipulator out of the way using the null space of the robot 662, etc.). By enabling the operator to have awareness of the robot's environment and using the XR device to constrain motion of components of the robot, operator control over complex movement behaviors of the robot using the XR system may be possible.

As discussed above, in some embodiments, an XR device may be used to control operations of a robot (e.g., robot 662, robot 500, etc.) that do not include movement of the robot. For instance, the operator of the XR device may use remote controller 658A and/or 658B to activate/deactivate all or part of one or more systems or components of the robot. As an example, when controlling robot 662 using remote controller 658A and/or 658B, operator 650 may activate/deactivate camera 678 and/or some other sensor arranged on robot 662. As another example, when controlling robot 500 using remote controller 658A and/or 658B, operator 650 may activate one or more of the perception modules 542 to capture one or more images that may be presented to the operator via the HMD 664, activate/deactivate distance sensors 516, and/or activate/deactivate a vacuum system that provides suction to a suction-based gripper mechanism arranged as a portion of end effector 550. In some embodiments, end effector 550 includes a plurality of suction based assemblies that can be individually controlled, and the operator 650 may use remote controller 658A and/or 658B to activate/deactivate all or a portion of the suction based assemblies in the suction-based gripper. For instance, the suction-based gripper mechanism may be divided into spatial zones and the operator 650 may use remote controller 658A and/or 658B to selectively activate one or multiple of the spatial zones of suction based assemblies. It should be appreciated that control of other types of non-movement operations is also possible.

In some embodiments, a first remote controller (e.g., remote controller 658A) may be used to control a non-movement operation of the robot and a second remote controller (e.g., remote controller 658B) may be used to control a movement operation of the robot to enable the operator 650 to perform control operations that include both movement and non-movement components. For instance, the operator 650 may use remote controller 658B to move a manipulator of the robot into position to capture an image of interest and the operator 650 may use remote controller 658A to activate a camera located on the manipulator of the robot to capture the image once the manipulator is in the desired position. In another example, the operator 650 may use remote controller 658A to capture a plurality of images (e.g., video) while the operator is using the remote controller 658B to move the manipulator (or some other component of robot 662) to enable simultaneous control of movement based and non-movement based control operations. Other control scenarios are also possible and contemplated.

Figure 7A:
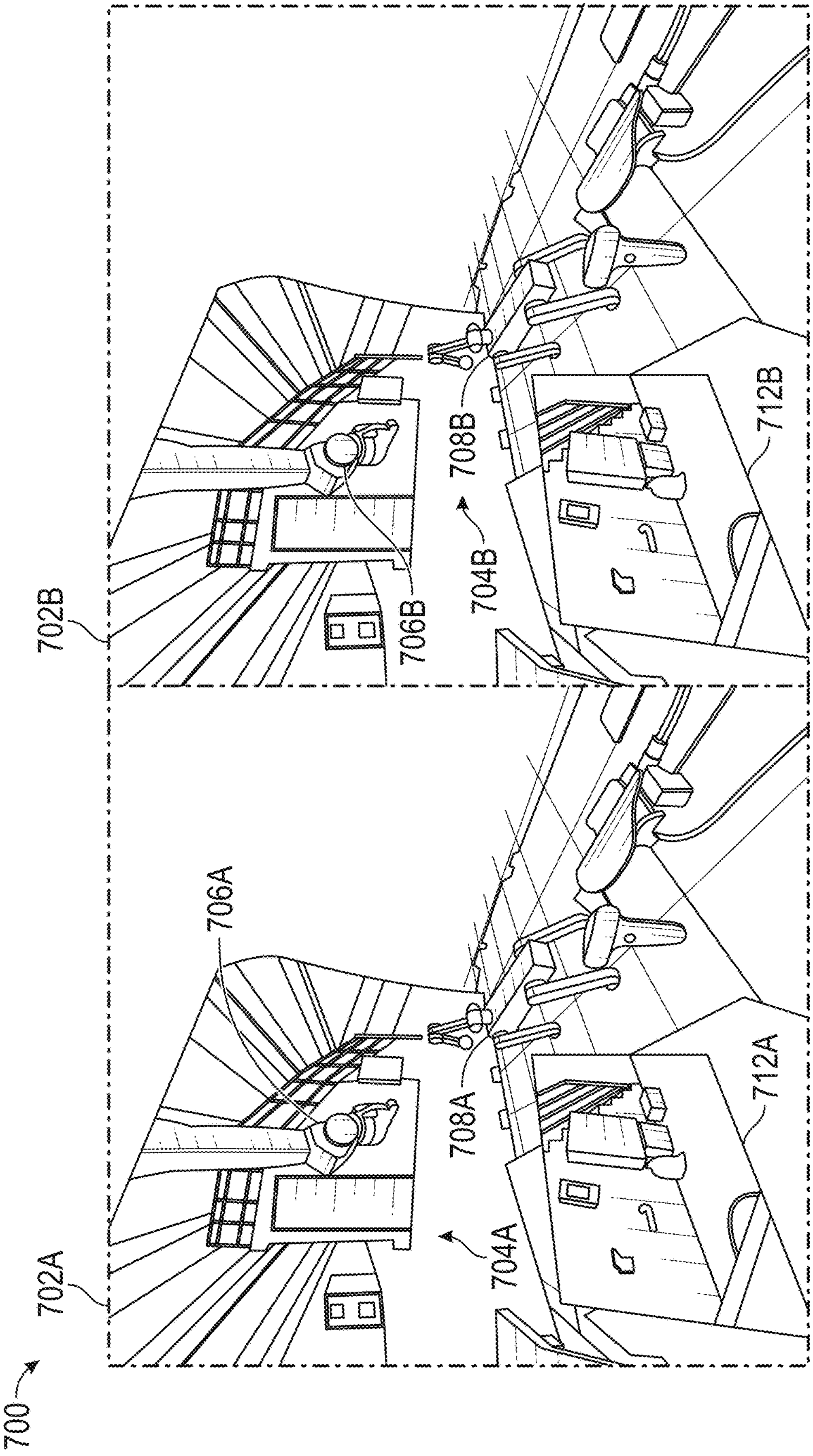
FIG. 7A is an example view shown to an operator of a robot via an XR display (one for the left eye and one for the right eye), according to an illustrative embodiment of the invention.
Figure 7B:
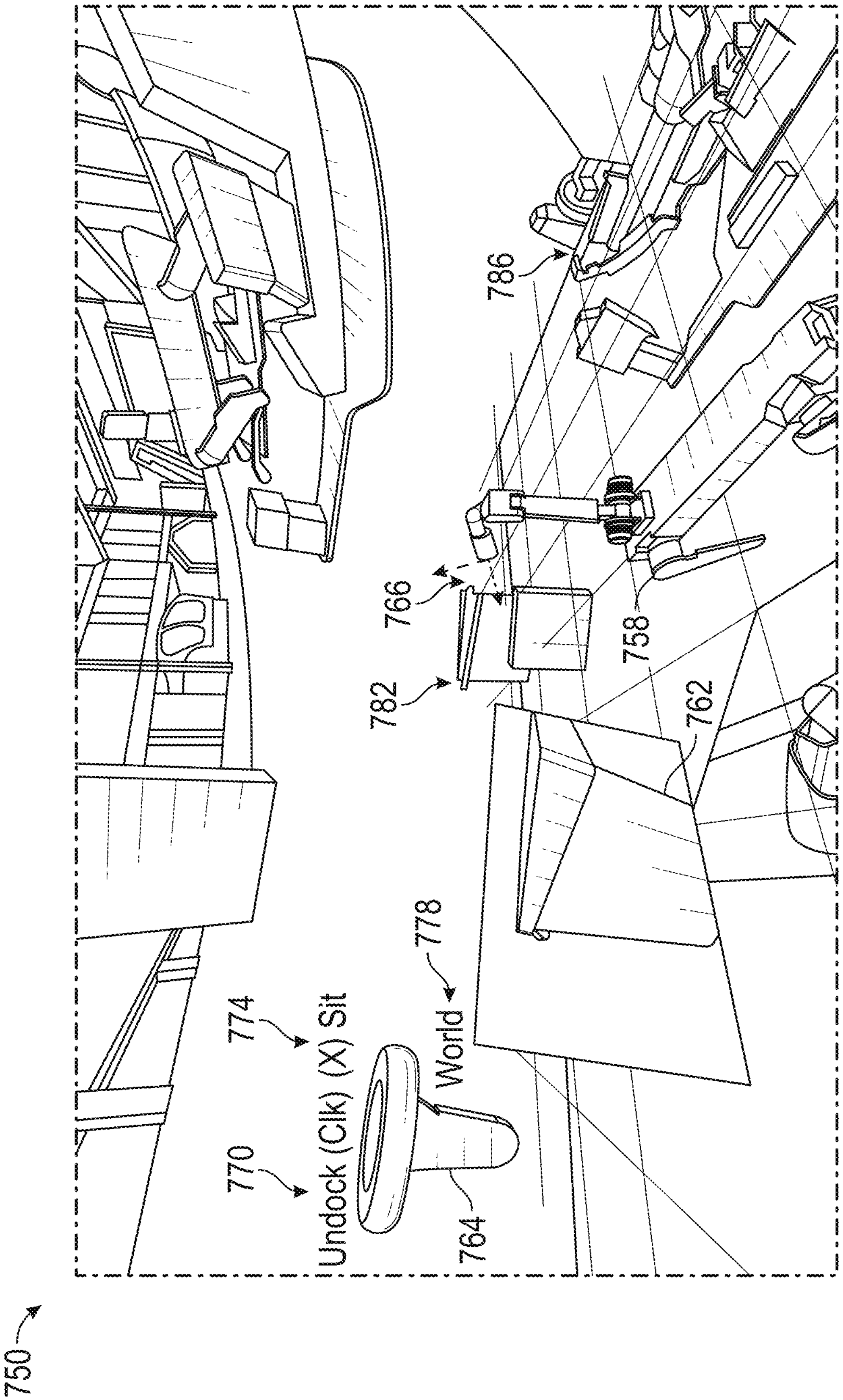
FIG. 7B is an example view as experienced by an operator of a robot via an XR display, according to an illustrative embodiment of the invention.

FIG. 7A is an example view 700 shown to an operator of a robot via an XR display (e.g., the HMD 612 shown and described above in FIG. 6A), according to an illustrative embodiment of the invention. FIG. 7 shows a first image 702A for the operator's left eye and a second image 702B for the operator's right eye. Each of the images 702A, 702B can show the same basic scene, but from slightly different vantage points (e.g., mimicking the slightly different locations of the human eyes) to enable a 3D representation when viewed from the vantage point of the operator. In this example, the XR display shows the environment 704A, 704B of the robot (e.g., as captured by the camera 620 shown and described above in FIG. 6A or the camera 678 shown and described above in FIG. 6C) and a portion of the manipulator arm including the gripper 706A, 706B. Each image 702A, 702B also includes a virtual illustration 708A, 708B (e.g., "avatar" or kinematic visualizer) of the robot, which can aid the operator in planning and/or performing certain manipulation tasks. For example, in some embodiments the avatar 708A, 708B is movable to a location specified by the operator, e.g., via a click-and-drag operation. In some embodiments, the video output includes a 2D video feed 712A, 712B (e.g., a repositionable "picture-in-picture" image), which can be sourced from another camera (e.g., a camera on-board the robot) to provide the operator an additional vantage point to consider. In some embodiments, the video output reflects one or more digital overlays, e.g., 3D terrain data generated by the perception system of the robot with camera data projected onto it, or other digital overlays, some of which are explained in greater detail below in FIG. 7B.

FIG. 7B is an example view 750 as experienced by an operator of a robot via an XR display (e.g., the HMD 612 shown and described above in FIG. 6A), according to an illustrative embodiment of the invention. In FIG. 7B, the view 750 is a 360-degree video sphere, which can provide the operator with an immersive experience in which every direction is viewable at the command of the operator. The view 750 includes certain elements shown in FIG. 7A, such as the avatar or robot kinematic visualizer (here shown as element 758) and the repositionable 2D video feed from the gripper camera (here shown as element 762). The view 750 also includes additional elements, such as an avatar 764 of one of the remote controllers shown and described above. In some embodiments, an avatar of each remote controller is separately visible. In some embodiments, a colorized point cloud (e.g., from a depth sensor mounted on the robotic manipulator) can be displayed (e.g., overlaid on certain objects, such as the trash bin 782 shown) to help the operator judge the distance of the object from the robot. In some embodiments in which a sensor is mounted on the robotic manipulator, the sensed information can be used to visualize data that would otherwise be occluded (e.g., inside a box or a trash can, which would only have outside surfaces visible to other cameras on the robot). In some embodiments, other 3D perception data (e.g., surface and/or texture information) can be overlaid on certain objects (e.g., another quadruped robot 786 shown in the view 750).

Certain other features are also viewable in greater detail in FIG. 7B. For example, a set of orthogonal vectors 766 overlaid on the video image, each having a common origin at a location within a grasp region of the robotic manipulator (e.g., a center of the grasp region), helps to illustrate a target grasp location and/or orientation for the manipulator in 3D space. In addition, an exemplary textual overlay 770 (the text "UNDOCK (CLK)") is included in the view 750, indicating that a control on the controller has been activated (e.g., a thumbstick has been depressed and/or pulled toward the controller). Another exemplary textual overlay 774 (the text "(X) Sit") is included in the view 750, indicating that the X button on the controller can be virtually pressed (e.g., by the operator pushing a finger through a floating hologram button with the text "(X) Sit" on it) to command the robot to sit (e.g., wherever the robot is when the X is pressed). Another textual overlay 778 (the text "World") is included in the view 750, which provides a "toggle" option to change the arm-commanded behavior from a position relative to the robot body to a position relative to an anchor in the physical world or environment. In some embodiments, the option selected can be apparent when the robot is commanded to move (e.g., the robot arm can stay in a certain position relative to the body, or the body can walk around the arm). In some embodiments, other textual and/or graphical overlays are also possible, e.g., battery life indicators, robot status indicators, and/or operator-selectable options for predefined robot behaviors. In addition, point cloud data (e.g., obtained from one or more sensors mounted on and/or in the gripper) can be colorized by an additional color camera (e.g., mounted on and/or in the gripper), which can provide a contrast to terrain data (which may be represented in black and white in the view 750).

Figure 8A:
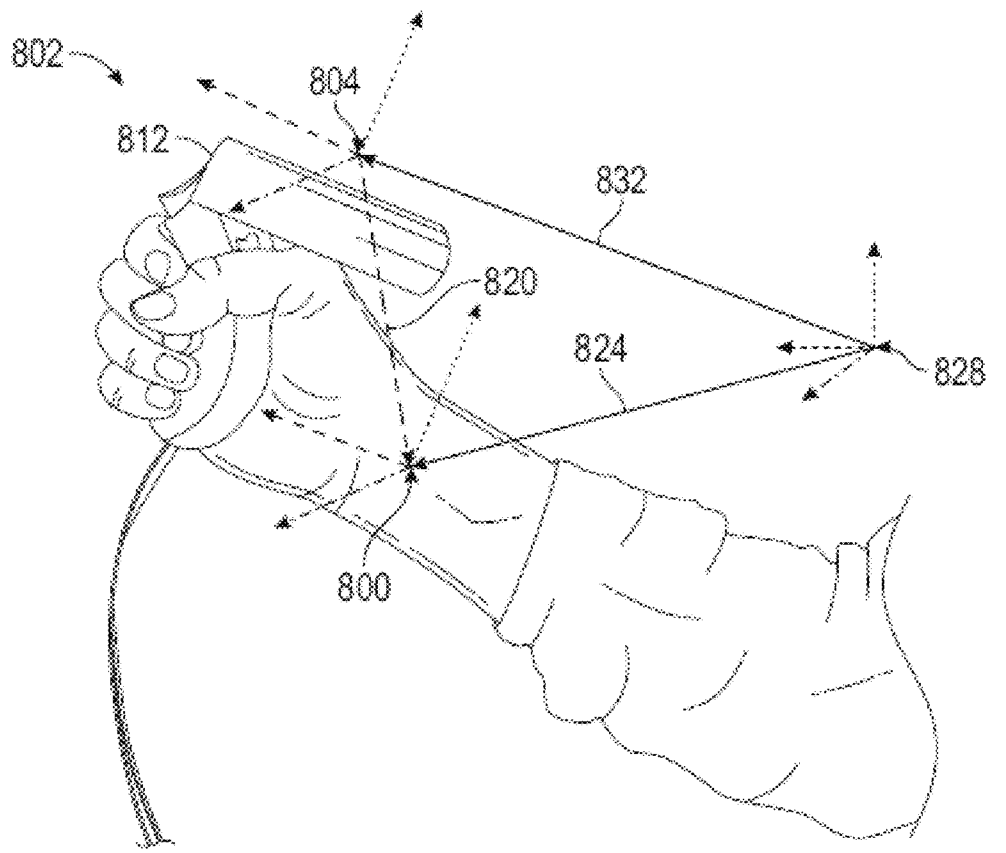
FIG. 8A is an exemplary illustration of a human arm having a human wrist center frame and a remote control frame displaced therefrom, according to an illustrative embodiment of the invention.

FIG. 8A is an exemplary illustration of a human arm 802 having a human wrist center frame (Tvr_Hf) 800 and a remote controller (here a joystick) frame (Tvr_Jf) 804 displaced therefrom, according to an illustrative embodiment of the invention. The human wrist center frame 800 can be visually illustrated by three mutually orthogonal vectors each having its origin at a center of motion of a human wrist as shown. In some embodiments, the human wrist center frame 800 can be represented by a 3D transformation 824 (e.g., a vector and a rotation) extending from a reference inertial frame 828. Similarly, the remote controller frame 804 can be visually illustrated by three orthogonal vectors, each having its origin at a fixed location (e.g., specified by the remote controller frame 804) with respect to the remote controller 812 (which can include, e.g., the remote controller 616B shown and described above in FIG. 6A). In some embodiments, the remote controller frame 804 can be represented by a 3D transformation 832 (e.g., a vector and a rotation) extending from the reference inertial frame 828. A 3D transformation (TJf_Hf) can be calculated between the human wrist center frame 800 and the remote controller frame 804, depicted by the line 820.

During operation, the human wrist center frame 800 can be calculated using the tracking information provided by the remote controller 812. For example, a frame pose can be provided by the remote controller 812 (e.g., via tracking beacons built into the remote controller 812) and/or updated by a HMD (e.g., the HMD 612 shown and described above in FIG. 6A). For instance, the HMD may include multiple cameras arranged to observe a location of tracking beacons to update the frame pose. In some embodiments, Tvr_Hf can be provided by suitable extended reality hardware, such as the remote controller 812 and/or other XR equipment. In some embodiments, Tvr_Hf can be calculated by multiplying Tvr_Jf and TJf_Hf. In some embodiments, TJf_Hf can be calculated empirically, e.g., by holding Tvr_Jf and Tvr_Hf constant. In some embodiments, suitable measurements can be obtained by having the operator keep one hand still while holding the joystick. In some embodiments, since the rotation portion of the transformation is an identity matrix, a distance between the operator's wrist center of motion and the joystick frame can be measured (e.g., using an approximate physical measurement). In some embodiments, this measurement can be done automatically, e.g., by the operator moving his or her hand while holding his or her wrist relatively stationary, and the system fitting the resulting Tvr_Jf data to the surface of a sphere (which can represent an effective direction and magnitude of the human wrist center frame 800 relative to the inertial frame 828). In some embodiments, this method enables Tvr_Hf to be calculated for the data set collected. In some embodiments, the calculation Tvr_Hf=Tvr_Jf*TJf_Hf can be used to obtain the transformation represented by line 820.

In some embodiments, some or all of this information (e.g., configuration information specific to a particular operator) can be cached and/or used during operation (e.g., it can be saved in a profile for the particular operator). In some embodiments, suitable measurements can be obtained and/or calculations performed each time an operator uses a remote controller. In some embodiments, some or all of this information can be initialized to a standardized operator profile (e.g., representing a 50th percentile human anthropometry) such that adequate results would be obtained for a majority of operators (e.g., those having non-extreme proportions). In some embodiments, multiple operator profiles can be provided (e.g., small handed, large handed, etc.) and/or a slider parameter can provided allowing customization between wrist center of motion and center of the operator's hand. In some embodiments, XR technology can in practice forgive a relatively large disconnect between proprioceptive senses and visual senses, such that small kinematic discrepancies may not be particularly consequential or obvious during operation.

Figure 8B:
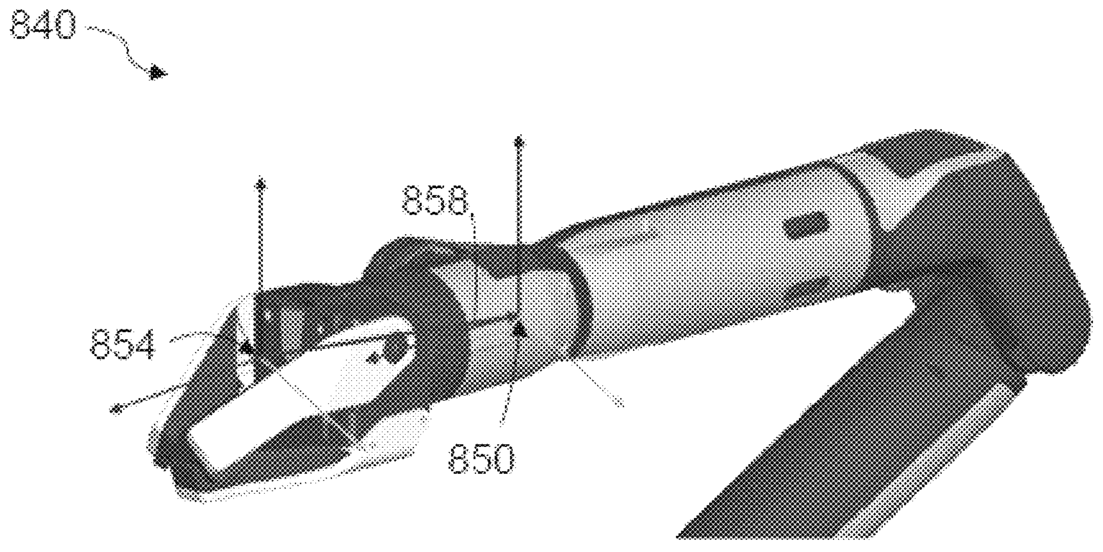
FIG. 8B is an exemplary illustration of a robotic manipulator arm having a robot wrist center frame and an end effector frame displaced therefrom, according to an illustrative embodiment of the invention.
Figure 8C:
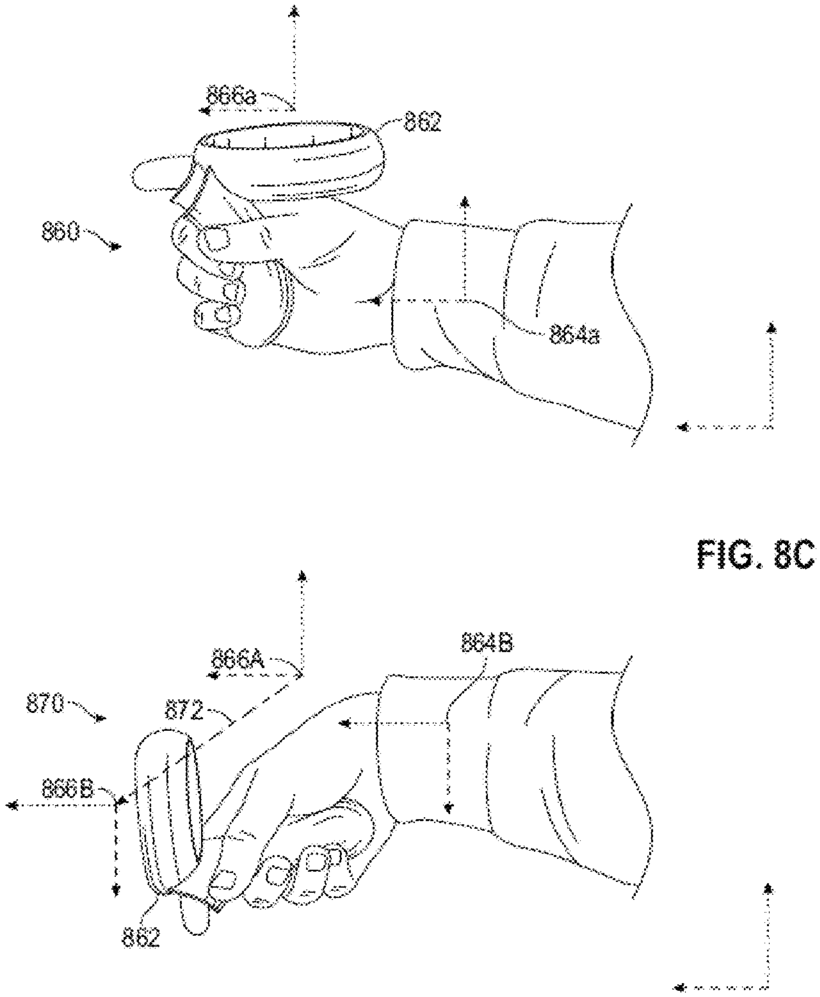
FIG. 8C is an exemplary illustration of two poses of a human wrist, a first pose at the beginning of a wrist rotation and a second pose at the end of the wrist rotation, according to an illustrative embodiment of the invention.
Figure 8D:
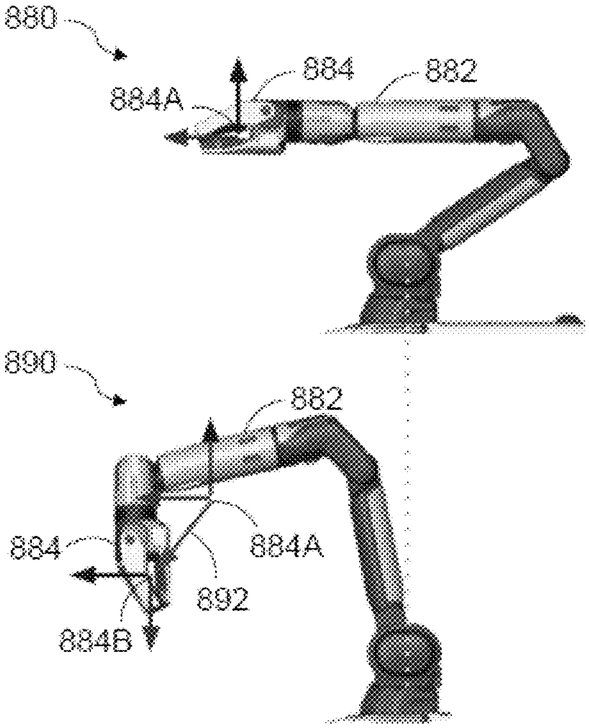
FIG. 8D is an exemplary illustration of two corresponding poses of a robotic manipulator arm attempting to mimic the movement shown in FIG. 8C with unintended consequences.

FIG. 8B is an exemplary illustration of a robotic manipulator arm 840 of a robot having a robot wrist center frame 850 and an end effector frame 854 displaced therefrom, according to an illustrative embodiment of the invention. The two frames can be depicted by mutually orthogonal vector sets similar to those described above. A 3D transformation can be calculated between these two frames, depicted by the line 858. During operation, the human wrist center frame 800 calculated above can be commanded at the robot wrist center frame 850, such that movements of the wrist of the robotic manipulator 840 mimic or otherwise correspond to movements of the wrist of the human arm 802 as shown in FIG. 8A above. This approach can provide distinct advantages during manipulation. For example, unintended or unnatural motion of the robotic end effector may result when a human wrist center frame 800 is not identified and mapped onto the robot wrist center frame 850. FIGS. 8C-8D illustrate one exemplary scenario resulting in such unintended consequences.

FIG. 8C is an exemplary illustration of two poses 860, 870 of a human wrist, a first pose (860) at the beginning of a wrist rotation and a second pose (870) at the end of the wrist rotation, according to an illustrative embodiment of the invention. The poses 860, 870 can be represented by the following transformations, which can be similar to those described above in FIGS. 8A-8B: a first set 864A, representing a position and orientation of a human wrist (corresponding to an initial human wrist center frame) at a first time; a second set 866A, representing a position and orientation of a remote controller (corresponding to an initial remote controller frame) at the first time; a third set 864B, representing a position and orientation of a human wrist (corresponding to a later human wrist center frame) at a second time; and a fourth set 866B, representing a position and orientation of a remote controller (corresponding to a later remote controller frame) at the second time. The positions and orientations in FIGS. 8C-8D are shown in 2D for simplicity, but one having ordinary skill in the art would readily understand how the same analysis can be applied in 3D.

In FIG. 8C, as the human hand moves from the first pose 860 to the second pose 870, the remote controller 862 may capture a physical displacement vector 872 of the wrist, when in fact the human wrist did not translate in space, but only pivoted about a wrist center of motion, resulting in zero net displacement of position coordinates. If this physical displacement vector 872 were applied at the robotic manipulator arm without appropriate corrections made, unintended consequences (e.g., unnatural, erratic, and/or unnecessary movement of the arm) may result. FIG. 8D is an exemplary illustration of two corresponding poses 880, 890 of a robotic manipulator arm 882 having a gripper 884 that is attempting to mimic the movement shown in FIG. 8C without making suitable corrections, and thus resulting in unintended consequences. In FIG. 8D, as the gripper 884 moves from the first frame 884A (representing a position and orientation of the gripper 884 at the first time, corresponding to 866A in FIG. 8C) to the second frame 884B (representing a position and orientation of the gripper 884 at the second time, corresponding to 866B in FIG. 8C), the displacement vector 892 (corresponding to the displacement vector 872 in FIG. 8C) is also applied, causing the robotic manipulator arm 882 to have vastly different configurations between the first pose 880 and the second pose 890, when in fact the most natural and desirable result would have been a simple pivot about the wrist center of mass of the robot joint corresponding to the human wrist.

Thus, in some embodiments, a workspace of the operator (e.g., including a human wrist) can be mapped onto a workspace of the robotic manipulator, and by identifying a wrist center of motion of the operator, extraneous displacement vectors can be eliminated so that when a human wrist rotates without translating in space, only rotations (and not translations) are applied about the corresponding robot joint. One skilled in the art will appreciate that although a "wrist" is depicted and described above, a similar methodology could apply to any number of joints of an operator and associated pivot points on the robot, and the disclosure is not limited in this respect. In some embodiments, the pivot points are specifiable and/or further customizable by the operator, rather than automatically determined by the system. For example, an operator could grab a nose of the gripper and pivot about the nose, rather than the wrist. In some embodiments, a similar approach can be used for the operator to specify a pose for the robot body (e.g., using hand tracking on an XR device). In some embodiments, a robot body can be selected and/or dragged in the operator's virtual reality environment, enabling the operator to move the robot according to operator commands. In some embodiments, a computing system can use this information to determine and/or issue steering instructions to the robot.

Figure 9:
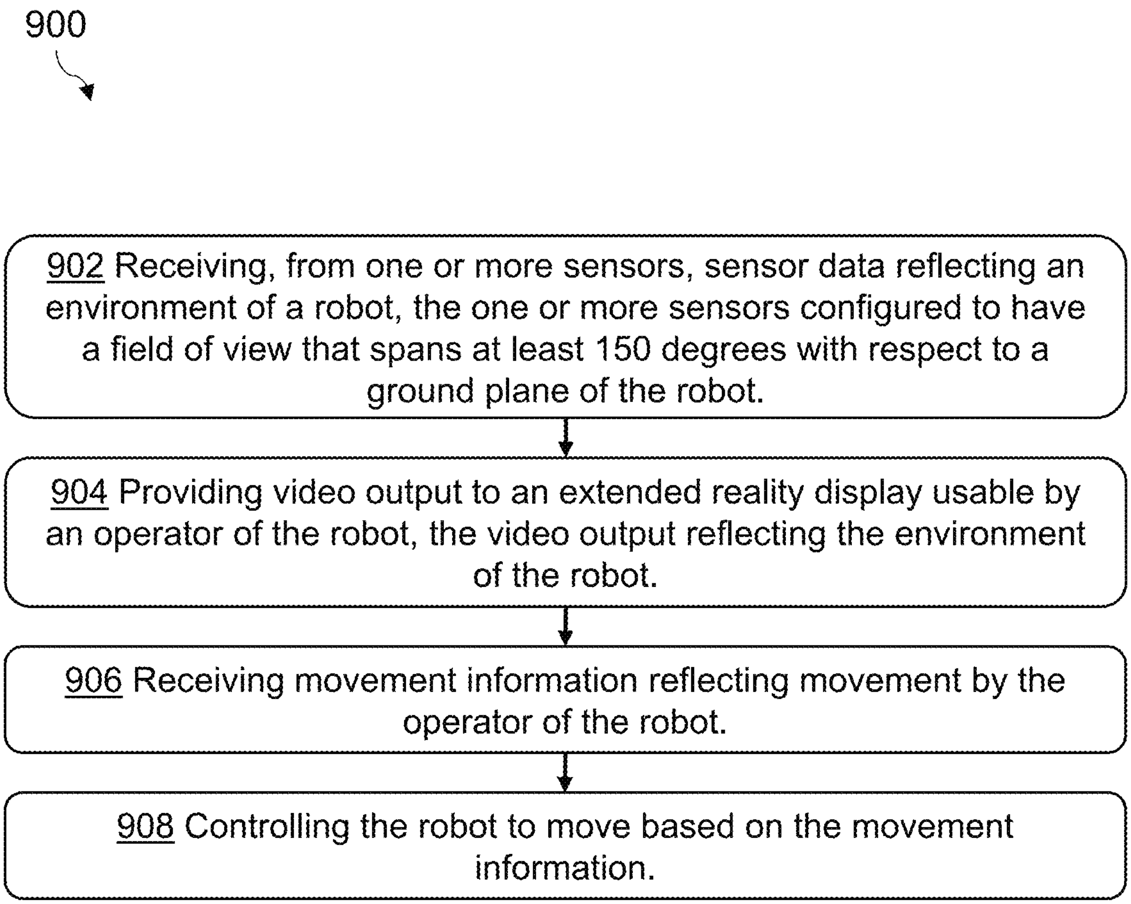
FIG. 9 is an example method of remotely controlling a robot with a manipulator, according to an illustrative embodiment of the invention.

FIG. 9 is an example method of remotely controlling a robot with a manipulator, according to an illustrative embodiment of the invention. In a first step 902, a computing device receives, from one or more sensors, sensor data reflecting an environment of a robot, the one or more sensors configured to span a field of view of at least 150 degrees with respect to a ground plane of the robot. In a second step 904, the computing device provides video output to an extended reality display usable by an operator of the robot, the video output reflecting the environment of the robot. In a third step 906, the computing device receives movement information reflecting movement by the operator of the robot. In a fourth step 908, the computing device controls the robot to move based on the movement information.

Figure 10:
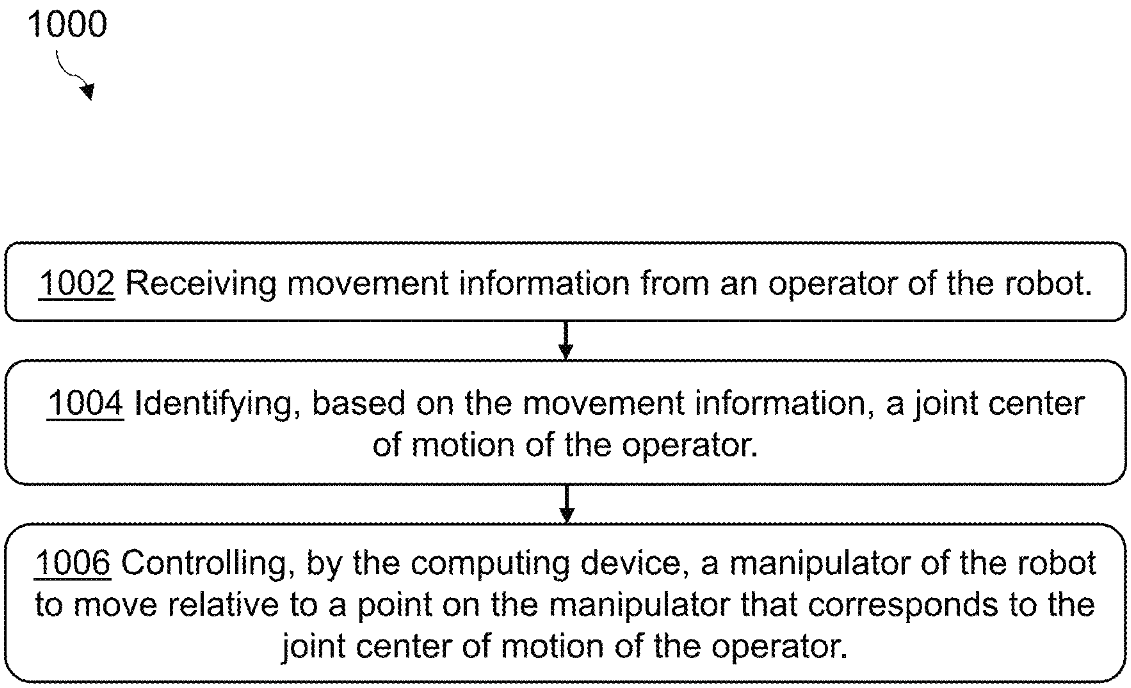
FIG. 10 is an example method of remotely controlling a robot with a manipulator based on identification of a joint center of motion, according to an illustrative embodiment of the invention.

FIG. 10 is an example method of remotely controlling a robot having a manipulator based on identification of a joint center of motion, according to an illustrative embodiment of the invention. In a first step 1002, a computing device receives movement information from an operator of the robot. In a second step 1004, the computing device identifies, based on the movement information, a joint center of motion of the operator. In a third step 1006, the computing device controls a manipulator of the robot to move relative to a point on the manipulator that corresponds to the wrist center of motion of the operator.

A number of implementations have been described. Nevertheless, it will be understood that various modifications may be made without departing from the spirit and scope of the disclosure.

The invention claimed is:

1. A robot, comprising:
- a manipulator;
- two or more legs;
- an image sensor located on the robot, wherein a field of view of the image sensor intersects a ground surface with respect to the robot and spans at least 150 degrees with respect to the ground surface;
- data processing hardware in communication with the image sensor; and
- memory in communication with the data processing hardware, the memory storing instructions, wherein execution of the instructions by the data processing hardware causes the data processing hardware to:
  - receive, from the image sensor, image data that reflects at least a portion of the ground surface with respect to the robot and corresponds to the field of view;
  - provide, to an extended reality (XR) display located separate from the robot, an output based on the image data that reflects the at least a portion of the ground surface with respect to the robot and corresponds to the field of view;
  - based on providing, to the XR display, the output, receive operator movement data indicating an operation to move to a location and grasp an object located in an environment of the robot and indicating a movement by an operator of the robot;

initiate a planning time period;

based on receiving the operator movement data, determine, during the planning time period, a combination of a first movement of the manipulator and a first movement of the two or more legs by the robot to move to the location and grasp the object according to a position of the robot relative to the object as indicated by a map of the environment, wherein the operator movement data and the combination of the first movement of the manipulator and the first movement of the two or more legs comprise different movement data;

determine, during the planning time period, a second movement of the manipulator or the two or more legs by the robot to maintain the robot in an upright position during performance of the combination of the first movement of the manipulator and the first movement of the two or more legs; and instruct, according to the second movement of the manipulator or the two or more legs and the combination of the first movement of the manipulator and the first movement of the two or more legs, the robot to move to the location using the two or more legs and to grasp the object using the manipulator, wherein receipt of the operator movement data and movement by the robot to the location are temporally separated by the planning time period.

2. The robot of claim 1, wherein the output comprises a virtual representation of the environment and a virtual representation of at least a portion of the robot within the environment.

3. The robot of claim 1, wherein the execution of the instructions by the data processing hardware further causes the data processing hardware to:

generate one or more waypoints based on the operator movement data, wherein the one or more waypoints indicate at least one of a body positioning of a body of the robot or a manipulator positioning of the manipulator, and wherein the second movement of the manipulator or the two or more legs and the combination of the first movement of the manipulator and the first movement of the two or more legs results in at least one of the body assuming the body positioning or the manipulator assuming the manipulator positioning;

store the one or more waypoints in the map of the environment; and determine the position of the robot relative to the object based on the map of the environment, wherein instructing the robot to move to the location and grasp the object is based on determining the position of the robot relative to the object.

4. The robot of claim 1, wherein the manipulator comprises an arm portion and a joint portion, wherein the execution of the instructions by the data processing hardware further causes the data processing hardware to:

receive, from an XR device, an input, wherein the input indicates a combination of a first movement of the arm portion and a first movement of the joint portion, wherein the first movement of the manipulator comprises the combination of the first movement of the arm portion and the first movement of the joint portion.

5. The robot of claim 4, wherein the execution of the instructions by the data processing hardware further causes the data processing hardware to:

identify, based on the operator movement data, a joint center of motion of the operator; and determine a point on the manipulator that corresponds to the joint center of motion of the operator, and wherein to instruct the robot to move to the location and to grasp the object, the execution of the instructions by the data processing hardware further causes the data processing hardware to:

instruct the manipulator to move relative to the point on the manipulator that corresponds to the joint center of motion of the operator.

6. The robot of claim 1, wherein the execution of the instructions by the data processing hardware further causes the data processing hardware to:

map a workspace of the operator to a workspace of the manipulator; and obtain, via an XR device, an input indicating an end state in the workspace of the operator.

7. The robot of claim 6, wherein the execution of the instructions by the data processing hardware further causes the data processing hardware to:

generate a trajectory of the manipulator based on the end state in the workspace of the operator; and generate a movement plan in the workspace of the manipulator based on the trajectory, the movement plan reflecting motion that is different from motion reflected in the operator movement data.

8. The robot of claim 1, wherein:

the robot is a first robot;

the data processing hardware is in electronic communication with the first robot and a second robot; and the execution of the instructions by the data processing hardware, causes the data processing hardware to:

determine a coordinated movement of the first robot and the second robot to perform a task; and control the first robot and the second robot to move in coordination based on determining the coordinated movement of the first robot and the second robot to perform the task.

9. The robot of claim 1, wherein the execution of the instructions by the data processing hardware further causes the data processing hardware to:

obtain, via a touch control or an audio input device of an XR device, an input, wherein the touch control comprises at least one of a stick, a button, or a trigger, wherein instructing the robot to move to the location and to grasp the object is based on the input.

10. The robot of claim 1, wherein to instruct the robot to move, the execution of the instructions by the data processing hardware further causes the data processing hardware to:

instruct utilization of a force control mode to control an amount of force applied at a joint of the manipulator to grasp and hold the object based on a determination that the object is detected to be in contact with the manipulator.

11. The robot of claim 1, wherein the robot comprises four legs, wherein a bottom portion of a body of the robot faces the ground surface during traversal of the environment by the robot, wherein a top portion of the body faces away from the ground surface during traversal of the environment by the robot, wherein the manipulator is connected to the top portion of the body, wherein the combination of movement of the manipulator and movement of the two or more legs further indicates a combination of the movement of the manipulator, a movement of the four legs, and a non-movement operation, and wherein the non-movement operation comprises an operation to activate or deactivate a system of the robot.

12. The robot of claim 1, wherein the operator movement data corresponds to a plurality of robots, the plurality of robots comprising the robot, wherein the plurality of robots are instructed to move according to the combination of movement of the manipulator and movement of the two or more legs.

13. The robot of claim 1, wherein the operator movement data further indicates a movement onto the object, wherein the execution of the instructions by the data processing hardware further causes the data processing hardware to:

determine that movement by the robot according to the operator movement data causes at least a portion of the robot to contact the object; and determine to grasp the object using the manipulator based on determining that the movement by the robot according to the operator movement data causes the at least a portion of the robot to contact the object, wherein determining the combination of movement of the manipulator and movement of the two or more legs is based on determining to grasp the object.

14. A method of controlling a robot, the method comprising:

receiving, by a computing device, from an image sensor located on the robot, image data that reflects at least a portion of a ground surface with respect to the robot and corresponds to a field of view of the image sensor, wherein the field of view of the image sensor intersects the ground surface with respect to the robot and spans at least 150 degrees with respect to the ground surface, wherein the robot comprises a manipulator and two or more legs;

providing, by the computing device, to an extended reality (XR) display located separate from the robot, an output based on the image data that reflects the at least a portion of the ground surface with respect to the robot and corresponds to the field of view;

based on providing, to the XR display, the output, receiving, by the computing device, operator movement data indicating an operation to move to a location and grasp an object located in an environment of the robot and indicating a movement by an operator of the robot;

initiate a planning time period;

based on receiving the operator movement data, determining, by the computing device, during the planning time period, a combination of a first movement of the manipulator and a first movement of the two or more legs by the robot to move to the location and grasp the object according to a position of the robot relative to the object as indicated by a map of the environment, wherein the operator movement data and the combination of the first movement of the manipulator and the first movement of the two or more legs comprise different movement data;

determining, by the computing device, during the planning time period, a second movement of the manipulator or the two or more legs by the robot to maintain the robot in an upright position during performance of the combination of the first movement of the manipulator and the first movement of the two or more legs; and instructing, by the computing device, according to the second movement of the manipulator or the two or more legs and the combination of the first movement of the manipulator and the first movement of the two or more legs, the robot to move to the location using the two or more legs and to grasp the object using the manipulator, wherein receipt of the operator movement data and movement by the robot to the location are temporally separated by the planning time period.

15. The method of claim 14, wherein the output comprises a virtual representation of the environment and a virtual representation of at least a portion of the robot within the environment.

16. The method of claim 14, further comprising:

generating one or more waypoints based on the operator movement data, wherein the one or more waypoints indicate at least one of a body positioning of a body of the robot or a manipulator positioning of the manipulator, and wherein the second movement of the manipulator or the two or more legs and the combination of the first movement of the manipulator and the first movement of the two or more legs results in at least one of the body assuming the body positioning or the manipulator assuming the manipulator positioning;

storing the one or more waypoints in the map of the environment; and determining the position of the robot relative to the object based on the map of the environment, wherein instructing the robot to move to the location and grasp the object is based on determining the position of the robot relative to the object.

17. The method of claim 14, wherein the manipulator comprises an arm portion and a joint portion, the method further comprising:

receiving, from an XR device, an input, wherein the input indicates a combination of a first movement of the arm portion and a first movement of the joint portion, wherein the first movement of the manipulator comprises the combination of the first movement of the arm portion and the first movement of the joint portion.

18. The method of claim 17, further comprising:

identifying, based on the operator movement data, a joint center of motion of the operator; and determining a point on the manipulator that corresponds to the joint center of motion of the operator, and wherein instructing the robot to move comprises:

instructing the manipulator to move relative to the point on the manipulator that corresponds to the joint center of motion of the operator.

19. The method of claim 14, further comprising:

mapping a workspace of the operator to a workspace of the manipulator; and obtaining, via an XR device, an input indicating an end state in the workspace of the operator.

20. The method of claim 19, further comprising:

generating a trajectory of the manipulator based on the end state in the workspace of the operator; and generating a movement plan in the workspace of the manipulator based on the trajectory, the movement plan reflecting motion that is different from motion reflected in the operator movement data.

21. The method of claim 14, wherein:

the robot is a first robot;

the computing device is in electronic communication with the first robot and a second robot, the method further comprising:

determining a coordinated movement of the first robot and the second robot to perform a task; and controlling the first robot and the second robot to move in coordination based on determining the coordinated movement of the first robot and the second robot to perform the task.

22. The method of claim 14, further comprising:

obtaining, via a touch control or an audio input device of an XR device, an input, wherein the touch control comprises at least one of a stick, a button, or a trigger, wherein instructing the robot to move to the location and to grasp the object is based on the input.

23. The method of claim 14, wherein instructing the robot to move comprises:

instructing utilization of a force control mode to control an amount of force applied at a joint of the manipulator to grasp and hold the object based on a determination that the object is detected to be in contact with the manipulator.

24. A system, comprising:

a robot, wherein the robot comprises a manipulator and two or more legs;

an image sensor located on the robot, wherein a field of view of each image sensor of the image sensor intersects a ground surface with respect to the robot and spans at least 150 degrees with respect to the ground surface;

an extended reality (XR) system including an XR display and at least one XR controller, wherein the XR system is located separate from the robot;

data processing hardware in communication with the image sensor; and memory in communication with the data processing hardware, the memory storing instructions, wherein execution of the instructions by the data processing hardware causes the data processing hardware to:

receive, from the image sensor, image data that reflects at least a portion of the ground surface with respect to the robot and corresponds to the field of view;

provide, to the XR display, an output based on the image data that reflects the at least a portion of the ground surface with respect to the robot and corresponds to the field of view;

based on providing the output to the XR display, receive, from the at least one XR controller, operator movement data associated with an object and indicating a movement by an operator of the robot;

initiate a planning time period;

based on receiving the operator movement data, determine, during the planning time period, a combination of a first movement of the manipulator and a first movement of the two or more legs by the robot to move to a location and grasp the object according to a position of the robot relative to the object as indicated by a map of an environment of the robot, wherein the operator movement data and the combination of the first movement of the manipulator and the first movement of the two or more legs comprise different movement data;

determine, during the planning time period, a second movement of the manipulator or the two or more legs by the robot to maintain the robot in an upright position during performance of the combination of the first movement of the manipulator and the first movement of the two or more legs; and instruct, according to the second movement of the manipulator or the two or more legs and the combination of the first movement of the manipulator and the first movement of the two or more legs, the robot to move to the location using the two or more legs and to grasp the object using the manipulator, wherein receipt of the operator movement data and movement by the robot to the location are temporally separated by the planning time period.

25. The system of claim 24, wherein the output comprises a virtual representation of the environment and a virtual representation of at least a portion of the robot within the environment.

26. The system of claim 24, wherein the execution of the instructions by the data processing hardware further causes the data processing hardware to:

generate one or more waypoints based on the operator movement data, wherein the one or more waypoints indicate at least one of a body positioning of a body of the robot or a manipulator positioning of the manipulator, and wherein the second movement of the manipulator or the two or more legs and the combination of the first movement of the manipulator and the first movement of the two or more legs results in at least one of the body assuming the body positioning or the manipulator assuming the manipulator positioning;

store the one or more waypoints in the map of the environment; and determine the position of the robot relative to the object based on the map of the environment, wherein instructing the robot to move to the location and grasp the object is based on determining the position of the robot relative to the object.

27. The system of claim 24, wherein the manipulator comprises an arm portion and a joint portion, wherein the execution of the instructions by the data processing hardware further causes the data processing hardware to:

receive, from an XR device, an input, wherein the input indicates a combination of a first movement of the arm portion and a first movement of the joint portion, wherein the first movement of the manipulator comprises the combination of the first movement of the arm portion and the first movement of the joint portion.

28. The system of claim 27, wherein the execution of the instructions by the data processing hardware further causes the data processing hardware to:

identify, based on the operator movement data, a joint center of motion of the operator; and determine a point on the manipulator that corresponds to the joint center of motion of the operator, and wherein to instruct the robot to move, the execution of the instructions by the data processing hardware further causes the data processing hardware to:

instruct the manipulator to move relative to the point on the manipulator that corresponds to the joint center of motion of the operator.

29. The system of claim 24, wherein the execution of the instructions by the data processing hardware further causes the data processing hardware to:

map a workspace of the operator to a workspace of the manipulator; and obtain, via an XR device, an input indicating an end state in the workspace of the operator.

30. The system of claim 29, wherein the execution of the instructions by the data processing hardware further causes the data processing hardware to:

generate a trajectory of the manipulator based on the end state in the workspace of the operator; and generate a movement plan in the workspace of the manipulator based on the trajectory, the movement plan reflecting motion that is different from motion reflected in the operator movement data.

31. The system of claim 24, wherein:

the robot is a first robot;

the system further comprises a second robot;

the data processing hardware is in electronic communication with the first robot and the second robot; and the execution of the instructions by the data processing hardware, causes the data processing hardware to:

determine a coordinated movement of the first robot and the second robot to perform a task; and control the first robot and the second robot to move in coordination based on determining the coordinated movement of the first robot and the second robot to perform the task.

32. The system of claim 24, wherein the execution of the instructions by the data processing hardware further causes the data processing hardware to:

obtain, via a touch control or an audio input device of an XR device, an input, wherein the touch control comprises at least one of a stick, a button, or a trigger, wherein instructing the robot to move to the location and to grasp the object is based on the input.

33. The system of claim 24, wherein to instruct the robot to move, the execution of the instructions by the data processing hardware further causes the data processing hardware to:

instruct utilization of a force control mode to control an amount of force applied at a joint of the manipulator to grasp and hold the object based on a determination that the object is detected to be in contact with the manipulator.

* * * * *